United States Patent
Jun

(10) Patent No.: US 11,661,637 B2
(45) Date of Patent: May 30, 2023

(54) METHOD FOR FORMING A COLD ROLLED, COATED AND POST BATCH ANNEALED STEEL SHEET

(71) Applicant: ArcelorMittal, Luxembourg (LU)

(72) Inventor: Hyun Jo Jun, Clinton, NJ (US)

(73) Assignee: ArcelorMittal, Luxembourg (LU)

(*) Notice: Subject to any disclaimer, the term of this patent is extended or adjusted under 35 U.S.C. 154(b) by 28 days.

(21) Appl. No.: 17/083,451

(22) Filed: Oct. 29, 2020

(65) Prior Publication Data

US 2021/0123114 A1 Apr. 29, 2021

Related U.S. Application Data

(63) Continuation of application No. 15/552,485, filed as application No. PCT/US2016/019428 on Feb. 24, 2016, now abandoned.
(Continued)

(51) Int. Cl.
*C21D 9/46* (2006.01)
*C21D 8/02* (2006.01)
(Continued)

(52) U.S. Cl.
CPC .............. *C21D 9/46* (2013.01); *B32B 15/013* (2013.01); *C21D 1/20* (2013.01); *C21D 1/25* (2013.01);
(Continued)

(58) Field of Classification Search
None
See application file for complete search history.

(56) References Cited

U.S. PATENT DOCUMENTS

| 7,780,799 B2 | 8/2010 | Goto et al. |
| 9,963,756 B2 | 5/2018 | Zhu et al. |

(Continued)

FOREIGN PATENT DOCUMENTS

| CN | 1910301 A | 2/2007 |
| CN | 103003460 A | 3/2013 |

(Continued)

OTHER PUBLICATIONS

Sahay, Satyam. "Annealing of Steel" ASM Handbook, vol. 4A, Steel Heat Treating Fundamentals and Processes. pp. 289-304. 2013. (Year: 2013).*

(Continued)

*Primary Examiner* — Brian D Walck
(74) *Attorney, Agent, or Firm* — Davidson, Davidson & Kappel, LLC

(57) ABSTRACT

A method for forming a cold rolled, coated and post batch annealed steel sheet is provided. The method includes cold rolling a steel sheet; coating the cold rolled steel sheet with a zinc or zinc alloy coating, the cold rolled, coated steel sheet having an initial hole expansion and an initial yield strength and post batch annealing the cold rolled, coated steel sheet at a tempering temperature in a range from 150 to 650° C., the post batch annealed steel sheet having a final hole expansion and a final yield strength. The steel sheet includes (in wt. %)C-0.1-0.3%, Mn-1-3%, Si-0.5-3.5%, Al-0.05-1.5% and Mo+Cr being between 0-1.0%. The final hole expansion is at least 80% greater than the initial hole expansion and the final yield strength is at least 30% greater than the initial yield strength.

49 Claims, 12 Drawing Sheets

Related U.S. Application Data

(60) Provisional application No. 62/120,426, filed on Feb. 25, 2015.

(51) Int. Cl.

| | | |
|---|---|---|
| *C23C 2/06* | (2006.01) | |
| *C23C 2/28* | (2006.01) | |
| *C21D 1/20* | (2006.01) | |
| *C21D 1/25* | (2006.01) | |
| *C23C 2/02* | (2006.01) | |
| *B32B 15/01* | (2006.01) | |
| *C21D 6/00* | (2006.01) | |
| *C22C 38/00* | (2006.01) | |
| *C22C 38/02* | (2006.01) | |
| *C22C 38/06* | (2006.01) | |
| *C22C 38/12* | (2006.01) | |
| *C22C 38/26* | (2006.01) | |
| *C22C 38/38* | (2006.01) | |
| *C23C 2/40* | (2006.01) | |

(52) U.S. Cl.
CPC ............. *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C22C 38/001* (2013.01); *C22C 38/002* (2013.01); *C22C 38/02* (2013.01); *C22C 38/06* (2013.01); *C22C 38/12* (2013.01); *C22C 38/26* (2013.01); *C22C 38/38* (2013.01); *C23C 2/02* (2013.01); *C23C 2/06* (2013.01); *C23C 2/28* (2013.01); *C23C 2/40* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2007/0071997 A1 | 3/2007 | Goto et al. |
| 2009/0238713 A1 | 9/2009 | Kinugasa et al. |
| 2013/0071687 A1 | 3/2013 | Takagi |
| 2013/0076187 A1 | 3/2013 | Flaster |
| 2014/0242414 A1 | 8/2014 | Minami et al. |

FOREIGN PATENT DOCUMENTS

| | | |
|---|---|---|
| EP | 2738278 A1 | 6/2014 |
| JP | 2011102437 A | 5/2011 |
| RU | 2312163 C2 | 12/2007 |
| RU | 2530199 C2 | 10/2014 |
| RU | 2531216 C2 | 10/2014 |
| WO | 2015015239 | 2/2015 |

OTHER PUBLICATIONS

F. J. Martinez-de-Pisón et al.: "Overall model of the dynamic behaviour of the steel strip in an annealing heating furnace on a hot-dip galvanizing line," Revista De Metalurgia, 46 (5) Septiembre-Octubre, 405-420, 2010.

"Single and Multi-stack Batch Annealing," Eurotherm by Schneider Electric, downloaded from the internet at https://www.eurotherm.com/metals-processing-applications-us/single-and-multi-stack-batch-annealing/, downloaded on Jun. 10, 2020.

"Continuous Annealing and Batch Annealing," World of Steel, downloaded from the internet at https://www.worldofsteel.com/Continuous%20Annealing%20and%20Batch%20Annealing.html, downloaded on Jun. 10, 2020.

\* cited by examiner

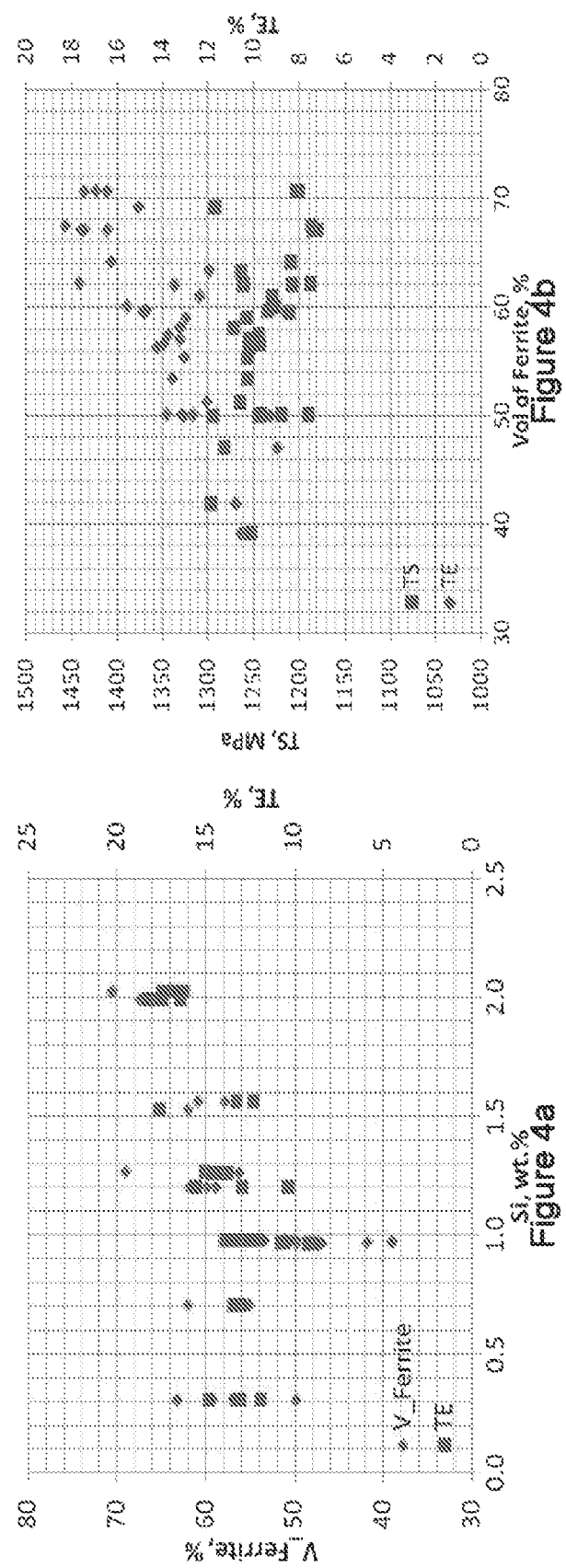

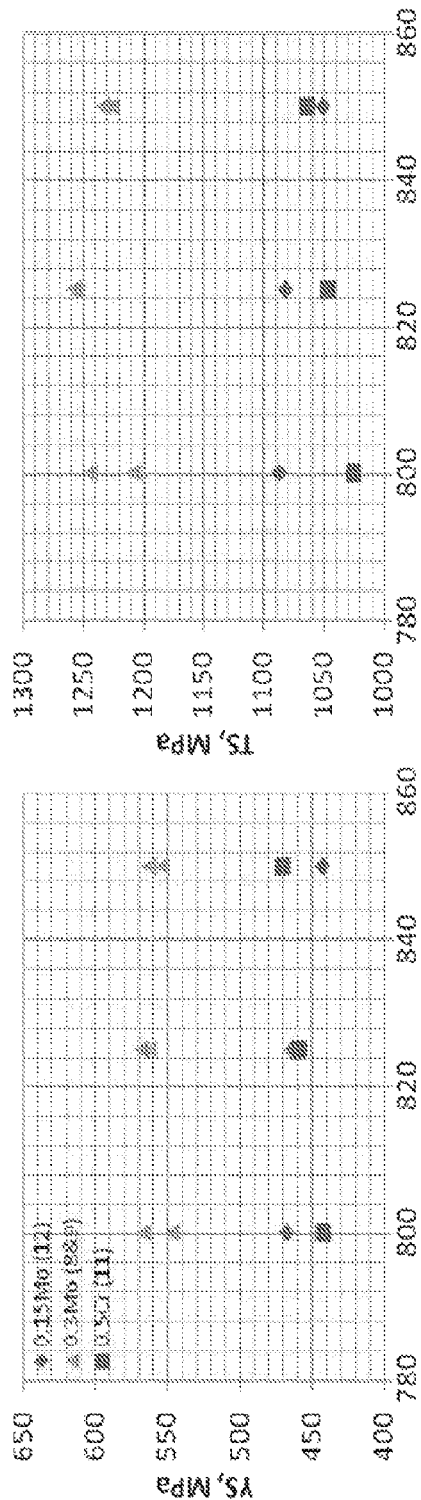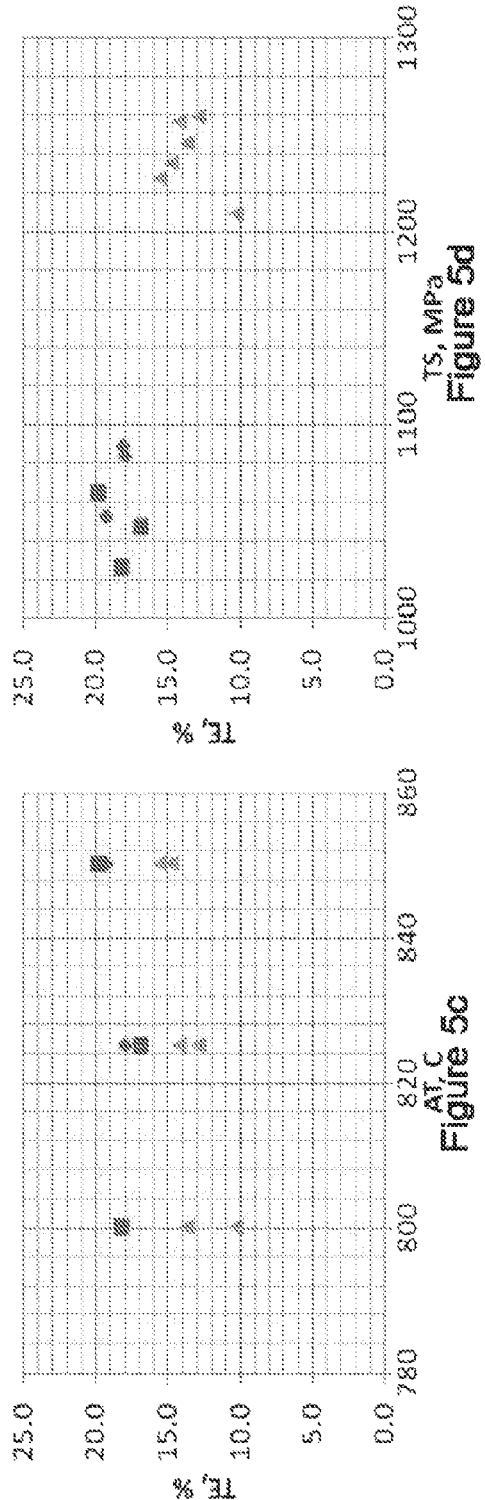

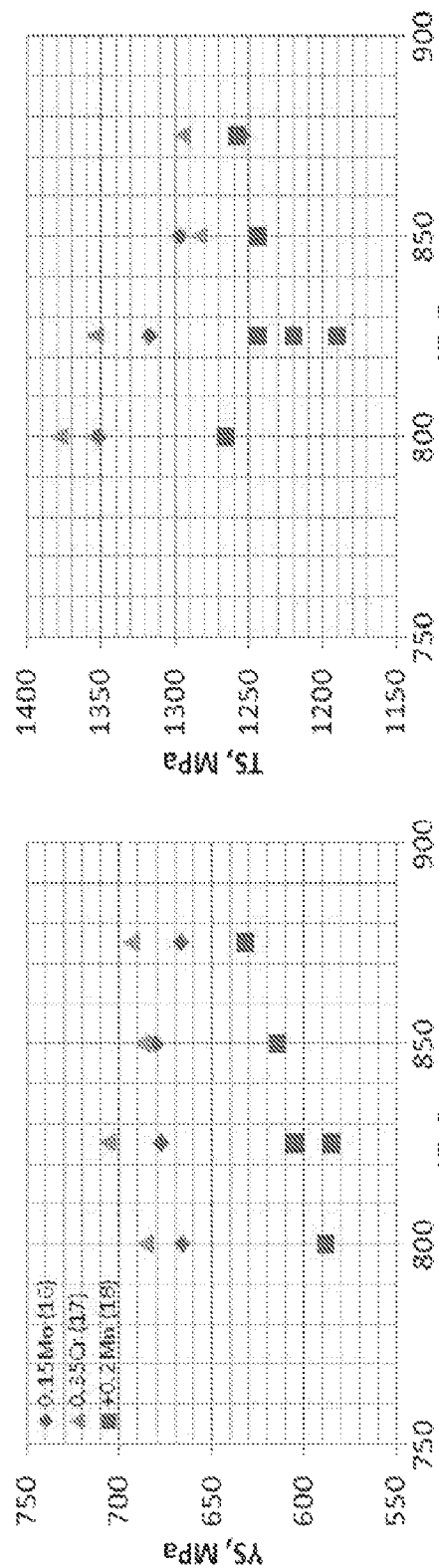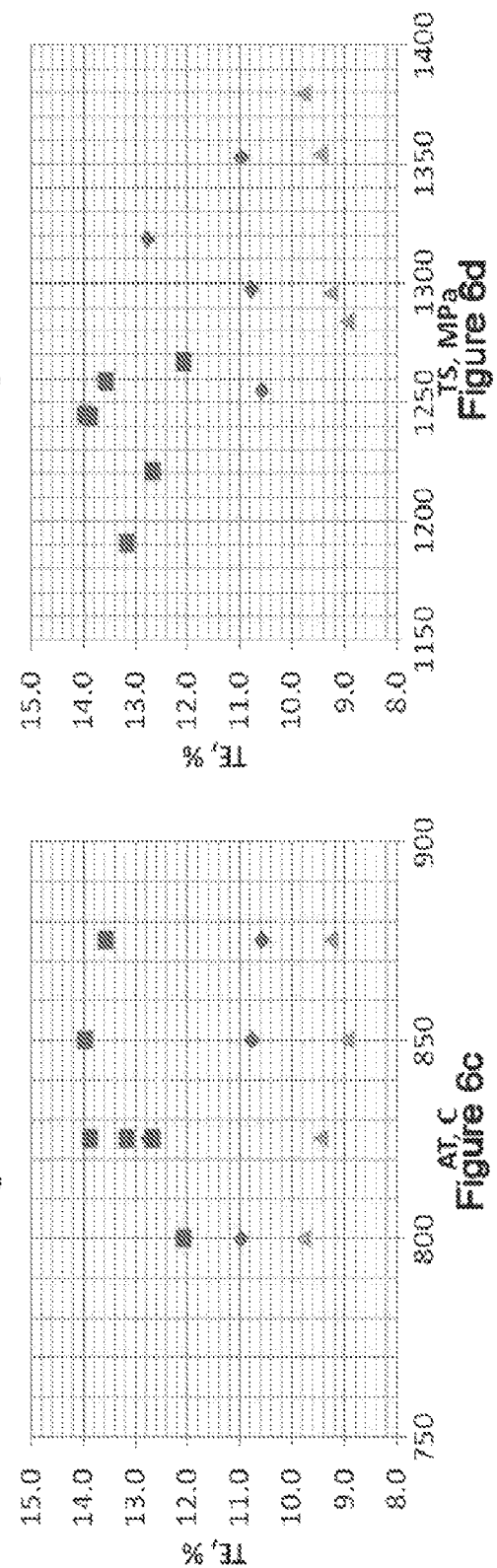

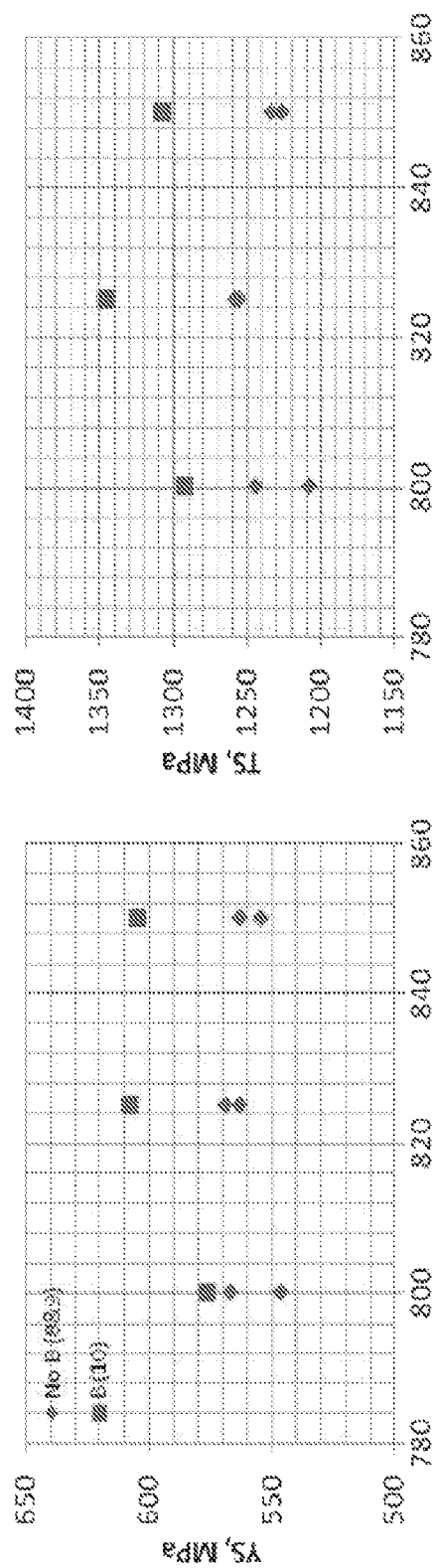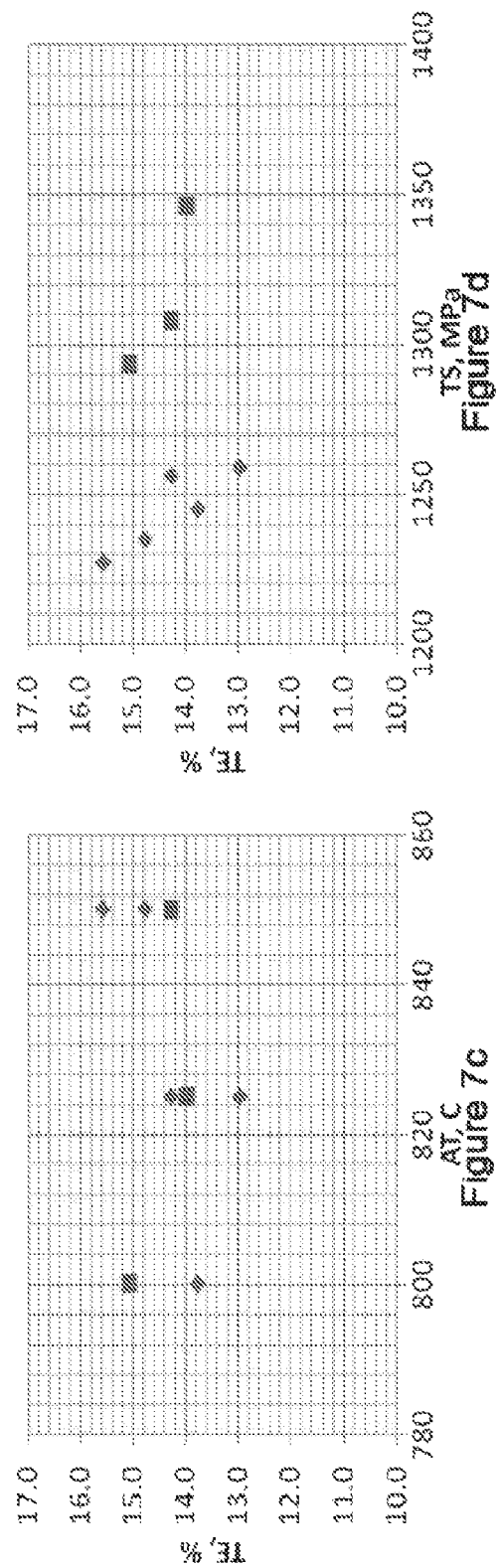
Figure 7a Figure 7b Figure 7c Figure 7d

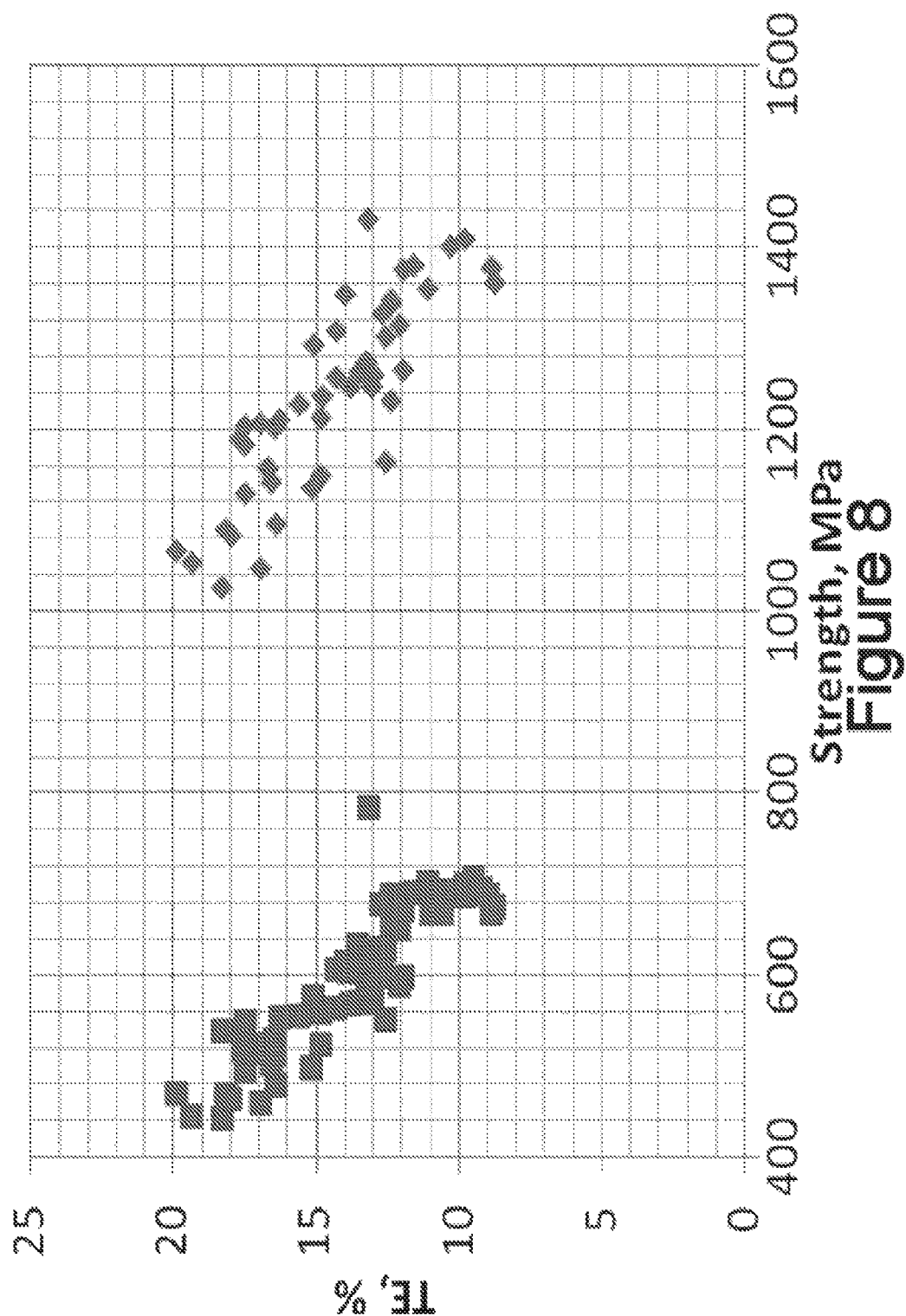

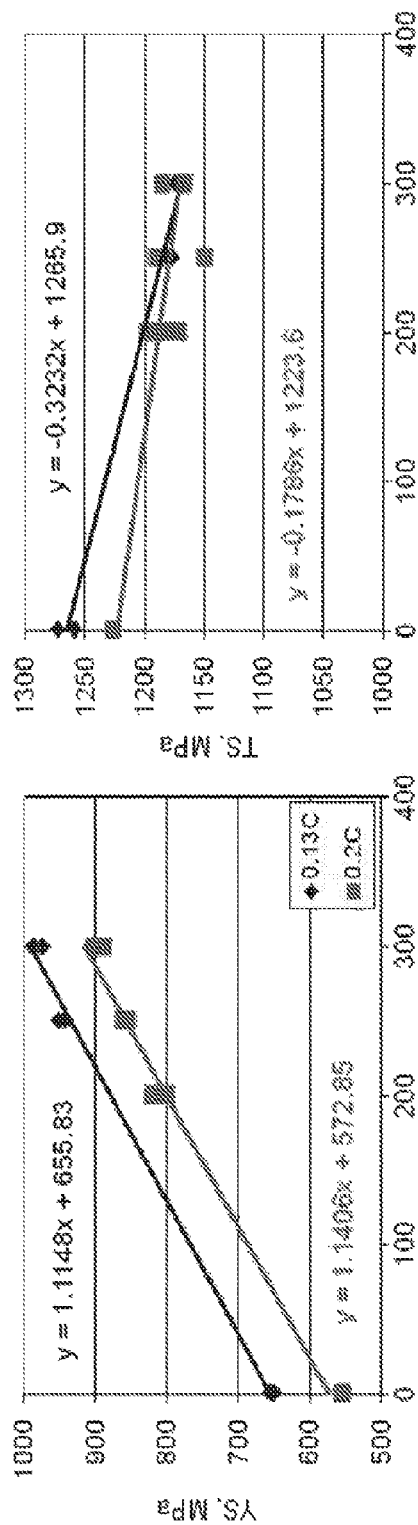
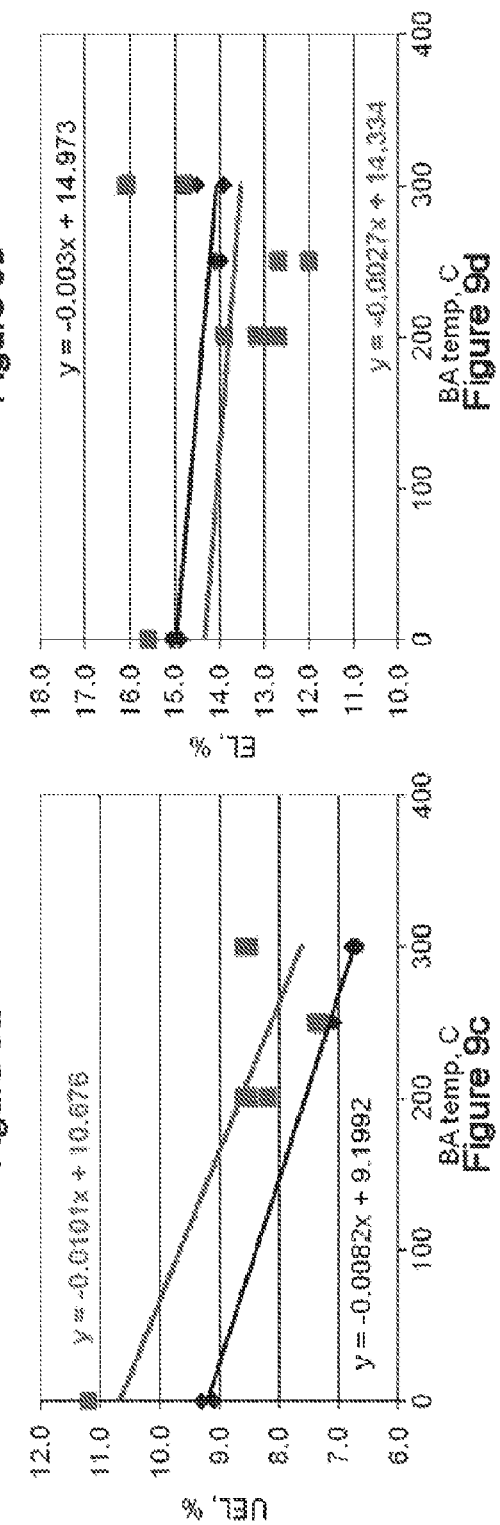

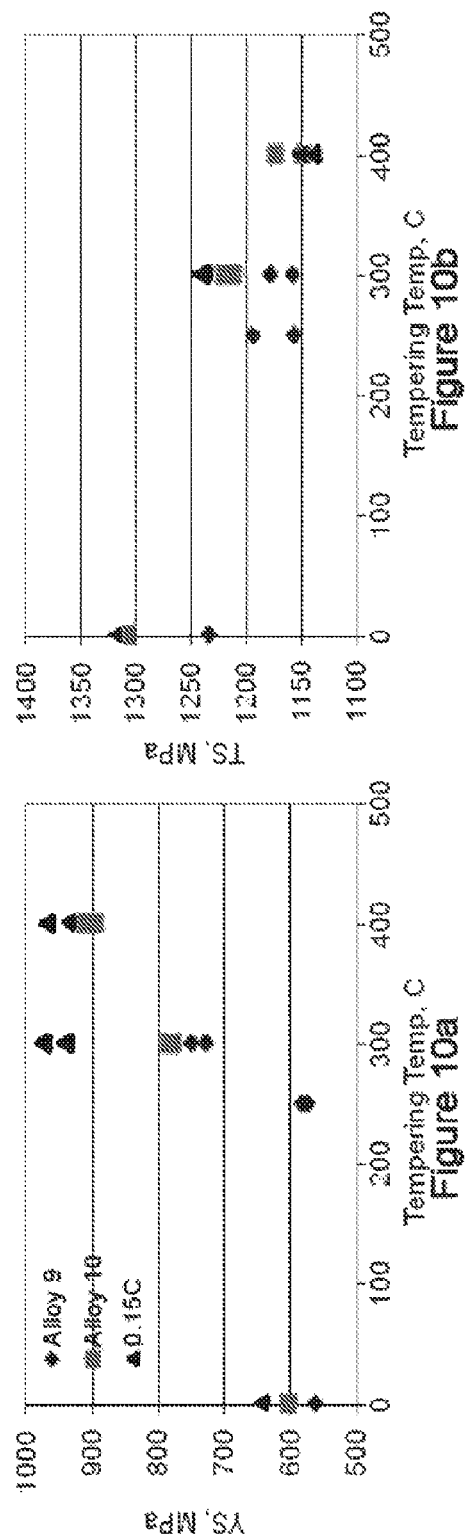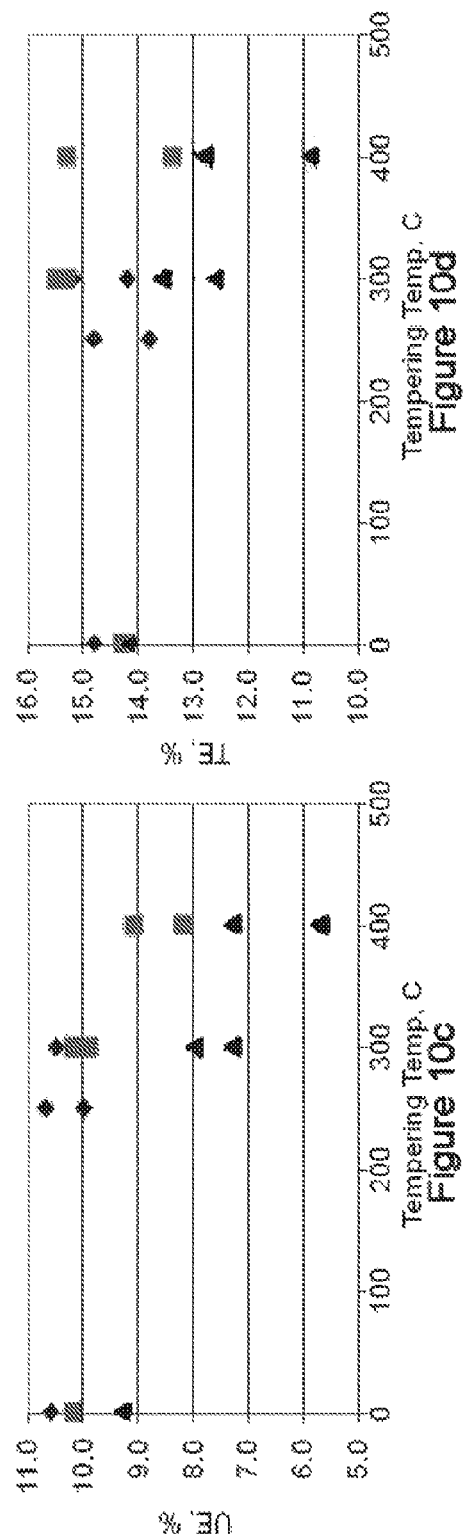

METHOD FOR FORMING A COLD ROLLED, COATED AND POST BATCH ANNEALED STEEL SHEET

CROSS-REFERENCE TO RELATED APPLICATIONS

This is a divisional of U.S. application Ser. No. 15/552,485 filed on Aug. 21, 2017 as a National Phase of PCT/US2016/019428 filed on Feb. 24, 2016 which claims the benefit under 35 U.S.C. 119(e) of U.S. Provisional Application No. 62/120,426 filed on Feb. 25, 2015, all of which are hereby incorporated by reference herein.

FIELD OF THE INVENTION

The present invention relates to steel sheet material. More specifically the present invention relates to steel sheet material having a zinc coating thereon. Most specifically, the present invention relates to steel sheet material having a zinc coating thereon having been post annealed after the coating process to increase yield strength and hole expansion of the coated steel sheet as compared with the as coated sheet.

BACKGROUND OF THE INVENTION

As the use of high strength steels increases in automotive applications, there is a growing demand for steels of increased strength without sacrificing formability. Growing demands for weight saving and safety requirement motivate intensive elaborations of new concepts of automotive steels that can achieve higher ductility simultaneously with higher strength in comparison with the existing Advanced High Strength Steels (AHSS).

Auto manufactures would like to be able to utilize a GI/GA 1180 HF steel grade in vehicles. This product is for a cold stamping application. Presently available steel compositions have been investigated to produce a GA HF T1180 grade steel. Based on laboratory studies which simulated the CL HDGL thermal profile, the as annealed properties cannot meet the tensile property (mostly YS) and hole expansion requirements.

Thus there is a need in the art for a coated 1180+MPa tensile strength, steel sheet with high formability. This requires an improvement in yield strength and hole expansion performance over steels currently in production.

SUMMARY OF THE INVENTION

The present invention relates to a cold rolled, coated and post annealed steel sheet. The cold rolled steel sheet may comprise (in wt. %): C-0.1-0.3%; Mn-1-3%; Si-0.5-3.5%; Al-0.05-1.5%; Mo+Cr is between 0-1.0%; and Mo+Cr is between 0.2-0.5%. The steel sheet may be coated with a zinc or zinc alloy coating. The coated steel sheet may be formed by cold rolling, zinc coating the cold rolled sheet and annealing said steel sheet after application of said zinc coating. The annealing may be performed at a temperature between 150-650° C., preferably between 150-450° C., and most preferably between 200-400° C. The annealing may be performed for a period of time sufficient to increase the yield strength of the annealed cold rolled coated steel sheet by at least 30% and preferably by at least 40% compared to the as coated cold rolled steel sheet.

The annealing may be performed for a period of time sufficient to increase the hole expansion of the annealed cold rolled coated steel sheet by at least 80% and preferably 95% compared to the as coated cold rolled steel sheet.

The annealing may be performed for a period of time sufficient to increase the total elongation of the annealed cold rolled coated steel sheet by at least 25% and preferably 40% compared with the as coated sheet.

The cold rolled steel sheet may preferably comprises C-0.15-0.25%; Mn-2-2.5%; Si-1.5-2.5%; and Al-0.05-1.0%.

BRIEF DESCRIPTION OF THE FIGURES

FIG. 4a plots volume of ferrite in % and total elongation TE in % vs weight % Si for samples exhibiting TS of about 1180-1300 MPa FIG. 4b plots tensile strength TS in MPa and total elongation TE in % vs volume of ferrite in % samples exhibiting TS of about 1180-1300 MPa;

FIG. 5a plots yield strength YS in MPa vs annealing temperature in ° C. for sample alloys 8, 9, 11 and 12.

FIG. 5b plots tensile strength TS in MPa vs annealing temperature in ° C. for sample alloys 8, 9, 11 and 12;

FIG. 5c plots total elongation TE in % vs annealing temperature in ° C. for sample alloys 8, 9, 11 and 12;

FIG. 5d plots total elongation TE in % vs tensile strength TS in MPa for sample alloys 8, 9, 11 and 12;

FIG. 6a plots yield strength YS in MPa vs annealing temperature in ° C. for sample alloys 16, 17 and 18;

FIG. 6b plots tensile strength TS in MPa vs annealing temperature in ° C. for sample alloys 16, 17 and 18;

FIG. 6c plots total elongation TE in % vs annealing temperature in ° C. for sample alloys 16, 17 and 18;

FIG. 6d plots total elongation TE in % vs tensile strength TS in MPa for sample alloys 16, 17 and 18;

FIG. 7a plots yield strength YS in MPa vs annealing temperature in ° C. for sample alloys 8, 9 and 10;

FIG. 7b plots tensile strength TS in MPa vs annealing temperature in ° C. for sample alloys 8, 9 and 10;

FIG. 7c plots total elongation TE in % vs annealing temperature in ° C. for sample alloys 8, 9 and 10;

FIG. 7d plots total elongation TE in % vs tensile strength TS in MPa for sample alloys 8, 9 and 10;

FIG. 8 plots the total elongation TE in % vs yield strength YS (squares) and tensile strength TS (diamonds) in MPa for all sample alloys;

FIG. 9a plots yield strength YS in MPa vs post batch annealing temperature in ° C. for sample alloys containing 0.13 and 0.2% C;

FIG. 9b plots tensile strength TS in MPa vs post batch annealing temperature in ° C. for sample alloys containing 0.13 and 0.2% C;

FIG. 9c plots uniform elongation UEL in % vs post batch annealing temperature in ° C. for sample alloys containing 0.13 and 0.2% C;

FIG. 9d plots total elongation EL in % vs post batch annealing temperature in ° C. for sample alloys containing 0.13 and 0.2% C;

FIG. 10a plots yield strength YS in MPa vs post batch annealing temperature in ° C. for sample alloys 9 and 10 and a sample alloy containing 0.15% C;

FIG. 10b plots tensile strength TS in MPa vs post batch annealing temperature in ° C. for sample alloys 9 and 10 and a sample alloy containing 0.15% C;

FIG. 10c plots uniform elongation UEL in % vs post batch annealing temperature in ° C. for sample alloys 9 and 10 and a sample alloy containing 0.15% C;

FIG. 10d plots total elongation EL in % vs post batch annealing temperature in ° C. for sample alloys 9 and 10 and a sample alloy containing 0.15% C;

DETAILED DESCRIPTION OF THE INVENTION

Figure 1:
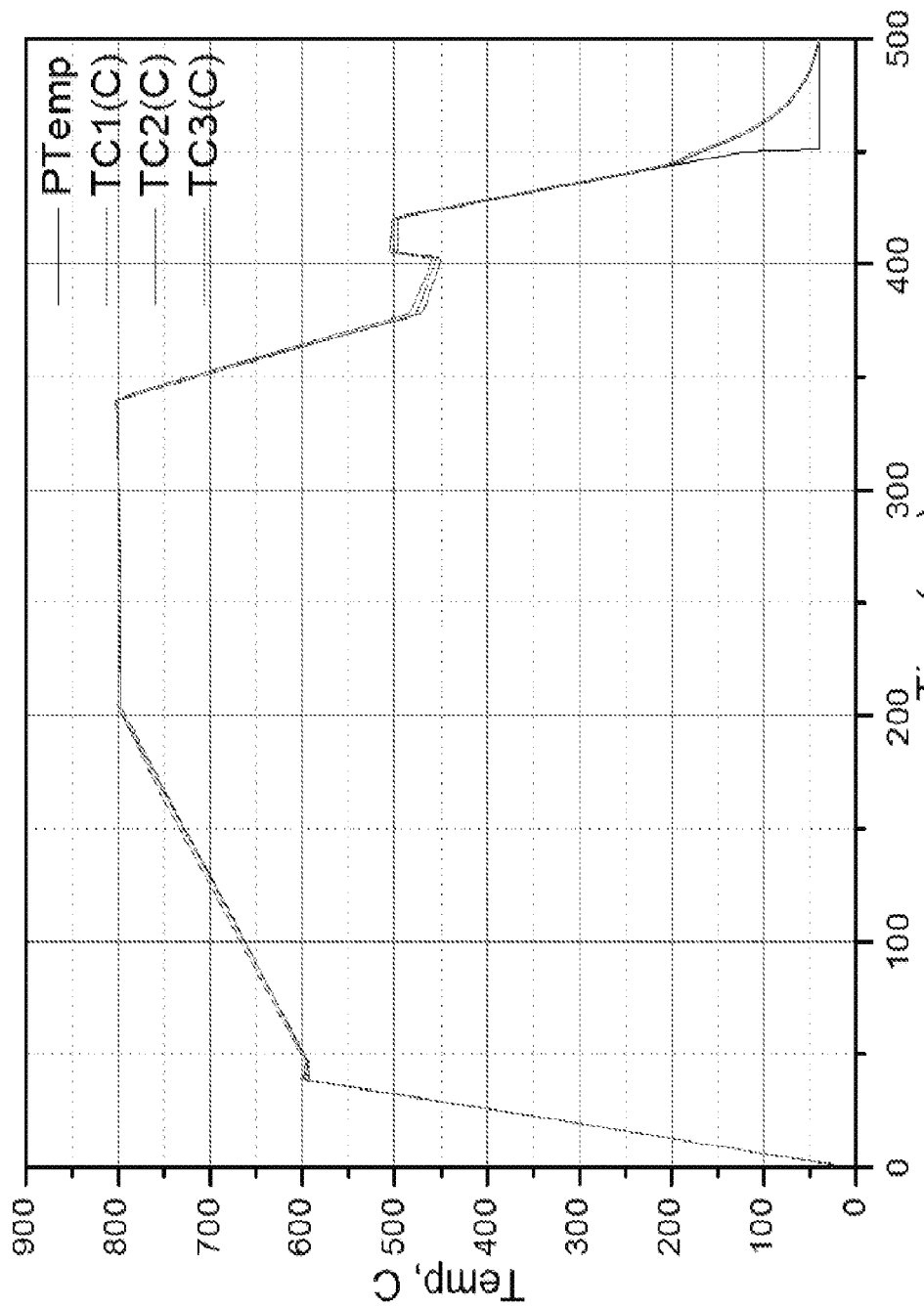
FIG. 1 plots temperature in ° C. vs time in seconds for a typical CL HDGL thermal cycle used in simulations for the present invention.

The carbon range of steel materials of the present invention is 0.1-0.3 wt %. The preferred range is about 0.15-0.25%. The minimum of 0.15% is required to achieve TRIP effect by retained austenite and strength. The maximum amount of 0.25% allows for better weldability. The manganese range of steel materials of the present invention is 1-3%, with 2-2.5% preferred. The minimum of 2% is necessary to achieve TS>980 MPa and the maximum amount of 2.5% is limited due to weldability and banded structure. The silicon range of steel materials of the present invention is 0.5-3.5%, with 1.5-2.5% preferred. The minimum of 1.5% is necessary to achieve the TRIP effect, while the maximum of 2.5% is limited due to weldability and Zn coatability. The aluminum range of steel materials of the present invention is 0.05-1.5%, with 0.05-1.0% preferred. The minimum of 0.5% is necessary to achieve the TRIP effect, while the maximum of 1% is limited by the required soak temperature at hot dip Zn coating line. Additionally the total amount of Mo and Cr should be 1% or less (i.e. Mo+Cr=0-1.0%) and the preferred level of Mo+Cr is 0.2-0.5% to achieve a TS>980 MPa. The remainder of the steel is iron with residuals at levels based on practical experiences.

The process condition for forming the coated steel material is standard and there are no special requirements from the steel making stage to hot dip Zn coating. The properties of the hot dip Zn coated steel sheet are then improved by post batch annealing. The peak temperature of the post batch annealing should be between 150-650° C., more preferably between 150-450° C., most preferably between 200-400° C. The preferred minimum temperature of 200° C. is necessary to achieve better formability and the preferred maximum of 400° C. is to better avoid the possibility of degradation of the Zn coating.

Alloy Composition

The ingots were produced by vacuum induction melting. The composition of the investigated steels is summarized in Table 1. The ingots have about 0.18-0.21% C at various ranges of Mn, Si, Al, Cr, Mo, Nb. The effect of each element on the mechanical properties and microstructure is discussed herein below.

TABLE 1

| ID | C | Mn | Si | Nb | Cr | Mo | Al | p | S | N | B |
|---|---|---|---|---|---|---|---|---|---|---|---|
| 1 | 0.18 | 2.2 | 0.7 | 0.011 | | 0.15 | 0.79 | 0.014 | 0.006 | 0.0056 | |
| 2 | 0.18 | 2.2 | 0.3 | 0.010 | | 0.16 | 1.23 | 0.010 | 0.006 | 0.0048 | |
| 3 | 0.19 | 2.5 | 0.7 | 0.010 | | 0.16 | 1.13 | 0.008 | 0.006 | 0.0044 | |
| 4 | 0.19 | 2.5 | 0.3 | 0.010 | | 0.15 | 1.51 | 0.008 | 0.006 | 0.0051 | |
| 5 | 0.20 | 1.8 | 1.6 | 0.017 | | 0.15 | 0.06 | 0.009 | 0.005 | 0.0061 | |
| 6 | 0.21 | 1.8 | 2.0 | 0.018 | | 0.16 | 0.07 | 0.008 | 0.005 | 0.0055 | |
| 7 | 0.21 | 1.8 | 2.5 | 0.018 | | 0.16 | 0.06 | 0.008 | 0.005 | 0.0056 | |
| 8 | 0.20 | 1.5 | 1.2 | 0.020 | | 0.30 | 0.64 | 0.005 | 0.005 | 0.0048 | |
| 9 | 0.21 | 1.5 | 1.3 | 0.020 | | 0.30 | 0.58 | 0.016 | 0.003 | 0.0041 | |
| 10 | 0.21 | 1.5 | 1.3 | 0.021 | | 0.30 | 0.58 | 0.016 | 0.003 | 0.0042 | 10 ppm |
| 11 | 0.20 | 1.5 | 1.2 | 0.020 | 0.50 | | 0.63 | 0.004 | 0.005 | 0.0047 | |
| 12 | 0.20 | 1.5 | 1.2 | 0.020 | | 0.15 | 0.64 | 0.004 | 0.005 | 0.0049 | |
| 13 | 0.20 | 1.5 | 1.5 | 0.020 | | 0.15 | 0.70 | 0.016 | 0.003 | 0.0043 | |
| 14 | 0.20 | 1.5 | 2.0 | 0.020 | | 0.16 | 0.73 | 0.016 | 0.003 | 0.0046 | |
| 15 | 0.20 | 1.8 | 2.0 | 0.020 | | | 0.71 | 0.016 | 0.003 | 0.0049 | |
| 16 | 0.20 | 2.3 | 1.0 | | | 0.15 | 0.05 | 0.01 | 0.003 | 0.0053 | |
| 17 | 0.19 | 2.3 | 1.0 | | 0.34 | | 0.05 | 0.009 | 0.003 | 0.0058 | |
| 18 | 0.20 | 2.5 | 1.0 | | | | 0.04 | 0.009 | 0.003 | 0.0052 | |

Hot Rolling and Cold Rolling

All ingots were initially hot rolled to 20 mm thick plates. Then, the plates were reheated and hot rolled again with finishing temperature (FT) in the range of 840 to 890° C. and coiling temperature (CT) in the range of 500 to 650° C. to an average final hot band thickness of 3.8 mm. Table 2 summarizes the tensile properties of hot bands v/s FT and intended CT. The results demonstrate that CT is the most important factor that determines the microstructure and tensile properties of hot bands. The higher CT of 650° C. increases the fraction of martensite, although it is commonly believed to result in a lower strength product. Increasing Mn, Cr, and Mo increases the hardenability of the steel and promotes the formation of martensite. The addition of Al, a ferrite stabilizer, promotes the formation of ferrite resulting in a lower strength hot band. The addition of Si, another ferrite stabilizer like Al, promotes ferrite formation; however, at the same hot rolling condition, it increases steel strength due to solid solution hardening. When the metallurgical design is finalized, the effect of hot rolling conditions on the microstructure and strength of hot bands will be discussed, as well as the cold rollability. Both sides of the hot bands were mechanically ground to remove the decarburized surface layer, followed by 50% cold reduction to about 1.5 mm gauge.

TABLE 2

| ID | FT, ° C. | aim CT, ° C. | YS, MPa | TS, MPa | TE, % | YPE, % | YR |
|---|---|---|---|---|---|---|---|
| 1 | 853 | 650 | 503 | 800 | 19.1 | 0.0 | 0.63 |
| 2 | 868 | 650 | 510 | 734 | 22.3 | 0.0 | 0.69 |
| 3 | 875 | 650 | 494 | 870 | 14.2 | 0.0 | 0.57 |
| 4 | 877 | 650 | 460 | 787 | 19.1 | 0.0 | 0.58 |
| 5 | 875 | 580 | 480 | 822 | 14.2 | 0.0 | 0.58 |
| 6 | 875 | 580 | 690 | 865 | 23.1 | 2.5 | 0.80 |
| 7 | 888 | 580 | 451 | 860 | 17.7 | 0.0 | 0.52 |
| 8 | 877 | 620 | 628 | 815 | 23.3 | 0.0 | 0.77 |
| 9 | 840 | 620 | 635 | 768 | 24.0 | 3.1 | 0.83 |
| 10 | 883 | 620 | 607 | 869 | 20.9 | 0.0 | 0.70 |
| 11 | 885 | 620 | 586 | 740 | 25.2 | 2.5 | 0.79 |
| 12 | 883 | 620 | 600 | 718 | 23.3 | 0.0 | 0.84 |
| 13 | 870 | 620 | 616 | 747 | 26.9 | 3.6 | 0.82 |
| 14 | 860 | 620 | 631 | 785 | 26.0 | 3.1 | 0.80 |
| 15 | 868 | 620 | 636 | 786 | 24.5 | 3.3 | 0.81 |
| 16 | 880 | 500 | 568 | 997 | 14.3 | 0.0 | 0.57 |
| 17 | 880 | 500 | 607 | 943 | 13.7 | 0.0 | 0.64 |
| 18 | 883 | 500 | 695 | 905 | 16.4 | 0.0 | 0.77 |

Table 3 shows JIS-T tensile properties of selected full hard steels. Tensile strengths TS of about 1200 to about 1350 MPa (170-195 ksi) are observed.

TABLE 3

| ID | Gauge, mm | YS, MPa | TS, MPa | UE, % | TE, % |
|---|---|---|---|---|---|
| 7 | 1.5 | 1163 | 1386 | 2.5 | 3.6 |
| 7 | 1.4 | 1180 | 1383 | 2.4 | 3.2 |
| 9 | 1.43 | 1058 | 1187 | 2.3 | 4.7 |
| 9 | 1.41 | 1068 | 1200 | 2.3 | 5.1 |
| 10 | 1.37 | 1121 | 1344 | 3.6 | 4.2 |
| 10 | 1.52 | 1102 | 1304 | 3.9 | 6.5 |
| 15 | 1.61 | 1095 | 1233 | 2.5 | 5.9 |
| 15 | 1.60 | 1102 | 1239 | 2.4 | 5.9 |

Annealing Simulations and Results

Annealing simulations were run using CAS (Continuous Annealing Simulator) utilizing laboratory processed full hard steels and CL HDGL thermal cycles. FIG. 1 plots temperature in ° C. vs time in seconds for a typical CL HDGL thermal cycle used in simulations by the present inventors. A wide range of annealing temperatures was investigated. Three thermocouples were used to ensure thermal homogeneity within the sample during reheating and cooling.

Effect of Si

Figure 2B:
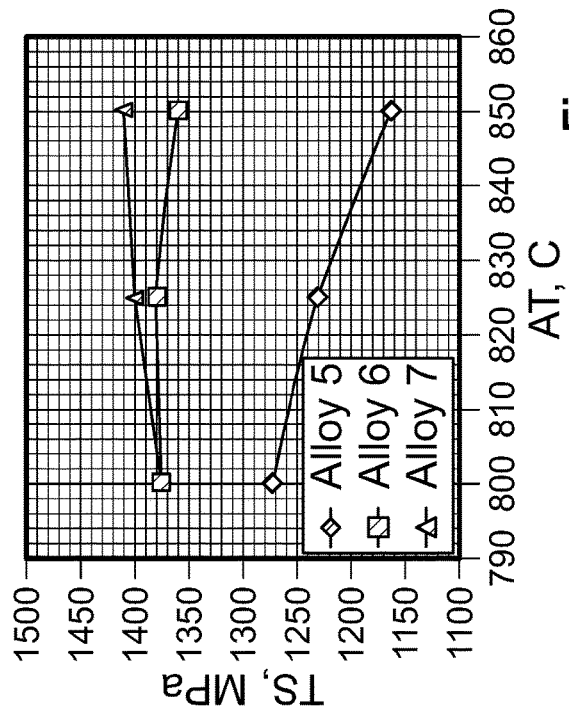
FIG. 2b plots tensile strength TS in MPa vs annealing temperature in ° C. for sample alloys 5, 6 and 7.
Figure 2D:
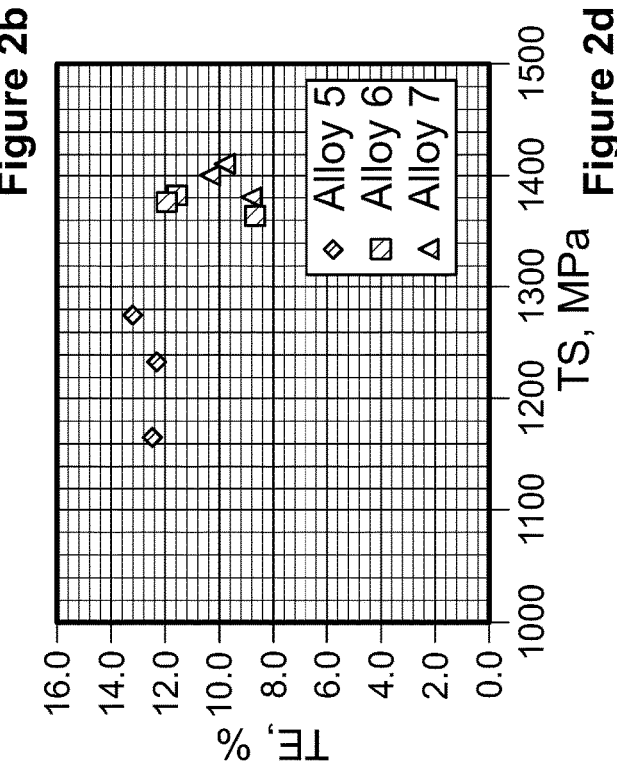
FIG. 2d plots total elongation TE in % vs tensile strength TS in MPa for sample alloys 5, 6 and 7.
Figure 2A:
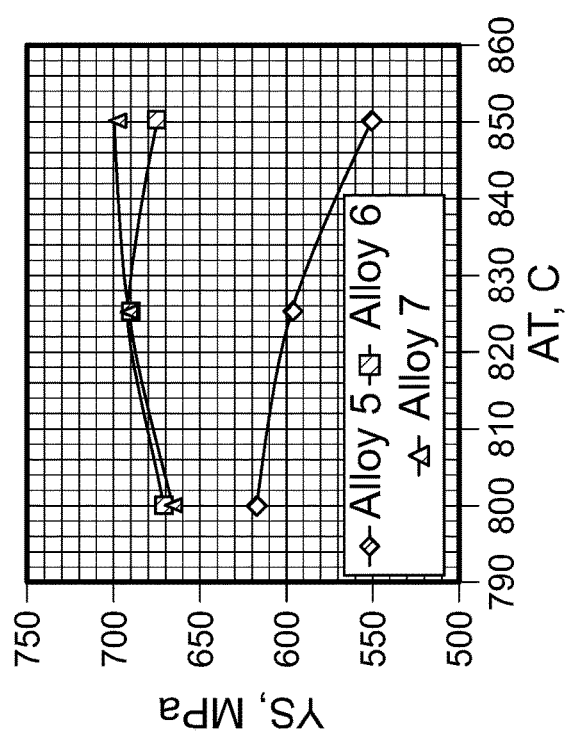
FIG. 2a plots yield strength YS in MPa vs annealing temperature in ° C. for sample alloys 5, 6 and 7.
Figure 2C:
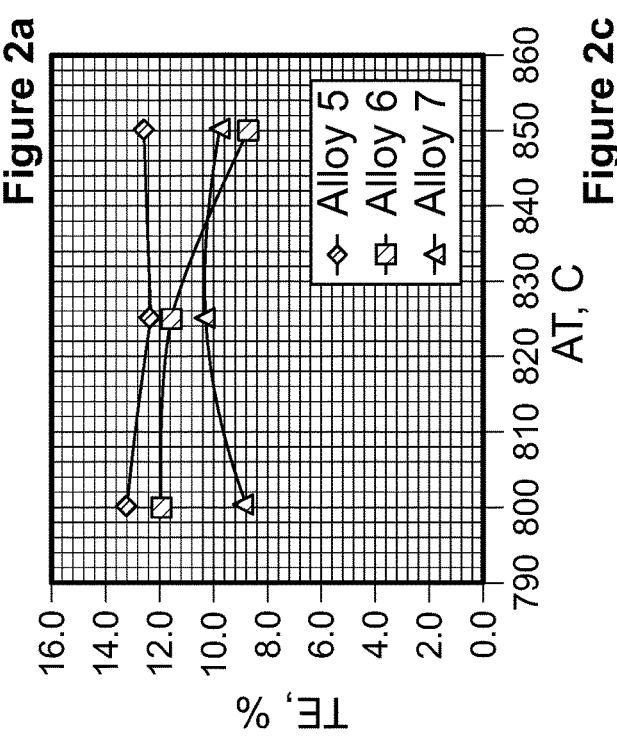
FIG. 2c plots total elongation TE in % vs annealing temperature in ° C. for sample alloys 5, 6 and 7.
Figure 3B:
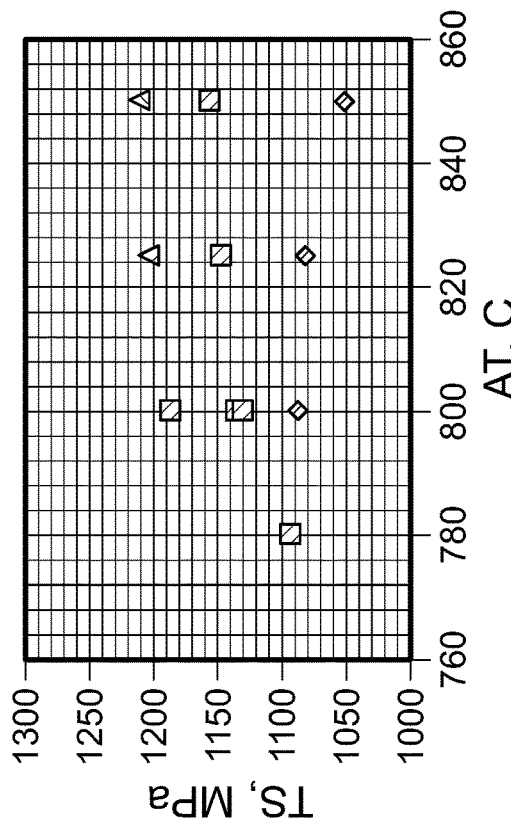
FIG. 3b plots tensile strength TS in MPa vs annealing temperature in ° C. for sample alloys 12, 13 and 14.
Figure 3D:
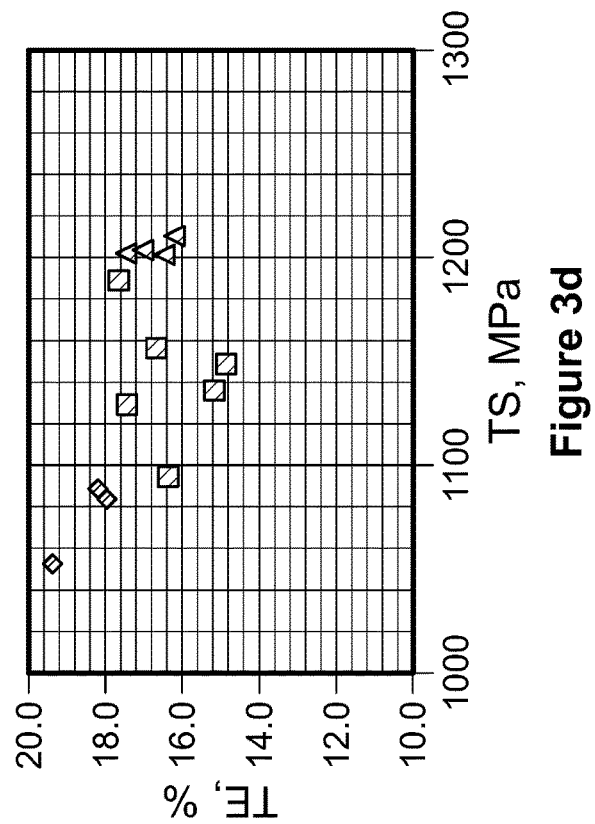
FIG. 3d plots total elongation TE in % vs tensile strength TS in MPa for sample alloys 12, 13 and 14.
Figure 3A:
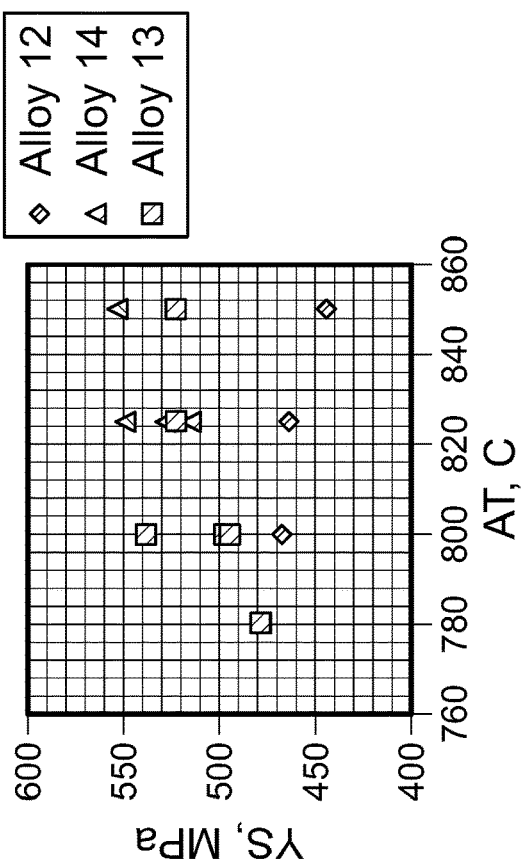
FIG. 3a plots yield strength YS in MPa vs annealing temperature in ° C. for sample alloys 12, 13 and 14.
Figure 3C:
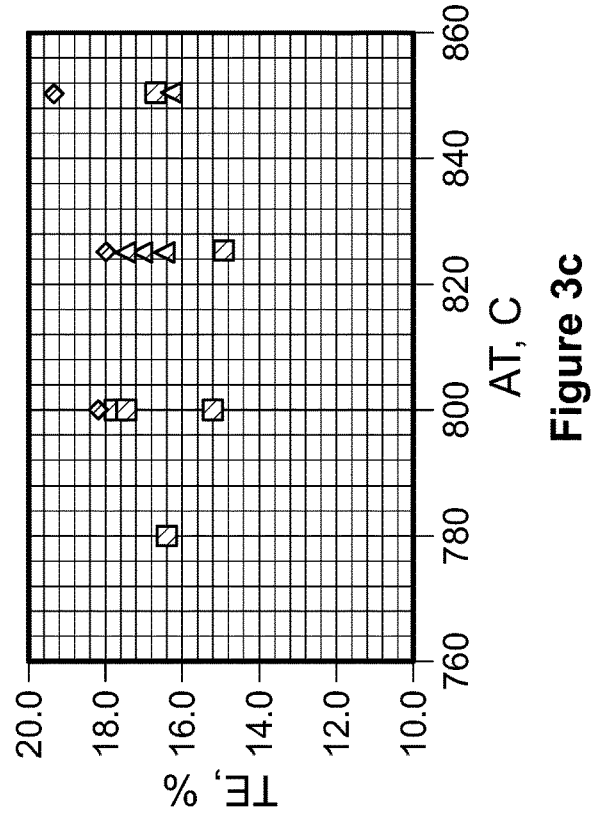
FIG. 3c plots total elongation TE in % vs annealing temperature in ° C. for sample alloys 12, 13 and 14.

There were two sets of compositions for the investigation of Si content on tensile properties, alloys 5/6/7 and alloys 12/13/14 with Si ranging from 1.2 to 2.5%. FIGS. 2a-2d and 3a-3d illustrate the effects of Si content and annealing temperature on the tensile properties of these two different sets of steels. FIG. 2a plots yield strength YS in MPa vs annealing temperature in ° C. for sample alloys 5, 6 and 7. FIG. 2b plots tensile strength TS in MPa vs annealing temperature in ° C. for sample alloys 5, 6 and 7. FIG. 2c plots total elongation TE in % vs annealing temperature in ° C. for sample alloys 5, 6 and 7. FIG. 2d plots total elongation TE in % vs tensile strength TS in MPa for sample alloys 5, 6 and 7. FIG. 3a plots yield strength YS in MPa vs annealing temperature in ° C. for sample alloys 12, 13 and 14. FIG. 3b plots tensile strength TS in MPa vs annealing temperature in ° C. for sample alloys 12, 13 and 14. FIG. 3c plots total elongation TE in % vs annealing temperature in ° C. for sample alloys 12, 13 and 14. FIG. 3d plots total elongation TE in % vs tensile strength TS in MPa for sample alloys 12, 13 and 14. The amount of Si in the first set (FIGS. 2a-2d) varies from 1.5 to 2.5% in a 0.2C-1.8Mn-0.15Mo-0.02Nb matrix, and the other set (FIGS. 3a-3d) has 1.2 to 2.0% Si in a matrix comprised of 0.2C-1.5Mn-0.3Mo-0.7Al-0.02Nb.

As shown in FIGS. 2a-2d, an increase in Si content from 1.5 to 2.0% significantly increases strength (yield strengty [YS], tensile strength [TS]) while marginally decreasing ductility. There is no significant strength enhancement as Si is further increased from 2.0 to 2.5%. A portion of the strength increase obtained upon increasing the Si content from 1.5 to 2.0% can be attributed to the solid solution hardening in these alloys; about 40-50 MPa for 0.5% Si addition. The increase in Si from 1.5 to 2.0 and 2.5% is also expected to increase Ac1 from 747° C. to 762° C. and 776° C. and Ac3 from 910° C. to 933° C. and 955° C., respectively, using Andrew's equations. In the 1.5% Si steel, the increase in anneal temperature from 800° C. to 825° C. and 850° C. is associated with a substantial increase in austenite formation. As the austenite content increases, it is diluted in carbon and is therefore less hardenable and more amenable to decomposition during the subsequent cooling. This behavior could explain the loss in strength with an increase in anneal temperature. As the Si content in the steel is increased from 1.5 to 2.0 and 2.5%, less austenite is formed at the same anneal temperature and it is also more hardenable. This could explain the relative stability in strength across annealing temperatures in the higher Si steels.

The strengths in the 2.0 and 2.5% Si bearing steels appear to be similar. That is, the higher solid solution strengthening in the 2.5% silicon steel is also associated with a relatively smaller volume fraction of martensite in comparison to the 2.0% Si bearing steel. The increase in Si from 1.5 to 2.0/2.5% is believed to enhance the hardenability of the steel as well. An additional potential reason for the difference in YS between 1.5Si and 2.0/2.5Si bearing steels may be attributable to the delay in the auto-tempering of martensite as the Si content in the steel is increased. The effect of Si among these alloys may be connected with other alloy effects.

As shown in FIGS. 3a-3d, the increase in Si from 1.2 to 2.0% in this base composition improves the balance between strength and ductility. The steels with a Si content of about 1.2-1.5% Si doesn't make TS>1180 MPa as the 0.7% Al addition substantially increasing the Ac1 and Ac3 temperatures. The steel with 2.0% Si demonstrates total elongation (TE)>16% at TS>1180 MPa. Since there is no significant amount of retained austenite that could result in substantial TRIP effect, the better ductility of the steel at higher Si content is attributed to Si solid solution hardening that allowed the attainment of the prescribed strength with less amount of martensite. It should be noted that the amount of Si for the best combination of strength-ductility depends on other alloying elements. Therefore, the Si amount should be optimized accordingly. In addition, the comparison between two sets of Si steels (FIGS. 2a-2d and 3a-3d) indicates that there is a kind of synergetic effects of Si and Al addition even if other alloying elements are different.

FIG. 4a shows the effect of Si addition on fraction of ferrite and TE in the samples having TS of about 1180-1300 MPa. FIG. 4a plots volume of ferrite in % and total elongation TE in % vs weight % Si for samples exhibiting TS of about 1180-1300 MPa. FIG. 4a plots tensile strength TS in MPa and total elongation TE in % vs volume of ferrite in % samples exhibiting TS of about 1180-1300 MPa. An increase in Si content reduces the volume fraction of martensite (increasing ferrite), and consequently improves ductility. The best combination of TS and TE (TS of 1200 MPa/TE of 16-18%) can be achieved at Vf (volume of –) of about 70% in alloy 14 containing 2.0% Si. The ferrite fraction of about 70% is considerably higher compared to about 30-40% ferrite in prior art CR DP T1180 with TE of 10-13%. However, the amount of Si should be optimized according to the overall alloy combination, in favor of a larger annealing process window, better weldability, and acceptable coatability. FIG. 4b plots the TS and TE as a function of ferrite fraction in samples exhibiting TS of about 1180-1300 MPa. It should be noted that the ferrite amount was measured by image analysis employing only one field per sample. Therefore, the observed trend and not to the absolute volume fraction of ferrite as a function of silicon addition provides the most important information.

Effect of Mn, Cr and Mo

It is well known that Mn, Cr and Mo increase the hardenability of the steel. The reduction in the amount of austenite to ferrite/bainite decomposition results in a higher fraction of martensite. Comparing investigated steels, it is possible to assess the relative hardenability of Mn, Cr and Mo.

FIGS. 5a-5d show the effect of various Mo and Cr additions on the tensile properties of 0.2C-1.5Mn-1.2Si-0.65Al-0.02Nb containing steel. FIG. 5a plots yield strength YS in MPa vs annealing temperature in ° C. for sample alloys 8, 9, 11 and 12. FIG. 5b plots tensile strength TS in MPa vs annealing temperature in ° C. for sample alloys 8, 9, 11 and 12. FIG. 5c plots total elongation TE in % vs annealing temperature in ° C. for sample alloys 8, 9, 11 and 12. FIG. 5d plots total elongation TE in % vs tensile strength TS in MPa for sample alloys 8, 9, 11 and 12. Steels containing 0.15Mo and 0.5Cr demonstrate similar hardenability and an addition of 0.3Mo is required in this base composition to achieve TS>1180 MPa at the investigated anneal temperatures.

FIG. 6a-6d compare the effects of 0.15Mo, 0.35Cr and increased (+0.2) Mn on the tensile properties of steels with a base composition of 0.2C-2.3Mn-1.0Si. FIG. 6a plots yield strength YS in MPa vs annealing temperature in ° C. for sample alloys 16, 17 and 18. FIG. 6b plots tensile strength TS in MPa vs annealing temperature in ° C. for sample alloys 16, 17 and 18. FIG. 6c plots total elongation TE in % vs annealing temperature in ° C. for sample alloys 16, 17 and 18. FIG. 6d plots total elongation TE in % vs tensile strength TS in MPa for sample alloys 16, 17 and 18. As shown in FIGS. 6a-6d, steels containing 0.15Mo and 0.35Cr have similar hardenability, and both had higher hardenability than +0.2Mn. All compositions display higher YS than steels based on 0.2C-1.5Mn-1.2Si-0.65Al-0.02Nb—X Mo/Cr since these compositions were fully austenitized in the investigated range of annealing temperatures which consequently promoted a partial bainite formation with lower amounts of ferrite. On the whole, none of the compared compositions demonstrated the desirable balance of TS and TE.

Effect of Boron

Effect of boron addition has been investigated by comparison of alloys 9 & 10 containing a base composition of 0.2C-1.5Mn-1.3Si-0.6Al-0.3Mo-0.02Nb. FIGS. 7a-7d show the effect of B addition on the tensile properties of the steel. FIG. 7a plots yield strength YS in MPa vs annealing temperature in ° C. for sample alloys 8, 9 and 10. FIG. 7b plots tensile strength TS in MPa vs annealing temperature in ° C. for sample alloys 8, 9 and 10. FIG. 7c plots total elongation TE in % vs annealing temperature in ° C. for sample alloys 8, 9 and 10. FIG. 7d plots total elongation TE in % vs tensile strength TS in MPa for sample alloys 8, 9 and 10. As can be seen, B addition increases YS and TS without a loss in ductility. It seems that B addition hardens the martensite additionally and refines the microstructure, which allows the retention of more ferrite at higher strength. The synergy effect of Mo—Nb—B (well understood in hot rolled steels) may have contributed to a better balance between strength and ductility. However, there is no detailed data/literature on how these elements affect transformation during cooling from intercritical temperatures.

The present inventors' objective is to achieve as high as possible total elongation at TS>1180 MPa. In order to reach this goal, the fraction of ferrite in the microstructure should be maximized since the ferrite seems to be the main contributor to ductility, as shown in FIG. 4b (even though the retained austenite contributes as well). However, higher ferrite fraction makes the steels softer due to its lower strength. Therefore, the ferrite and martensite should be hardened as much as possible to reach TS>1180A/Pa in conjunction with superior ductility. In addition, the metallurgy has to be sound in terms of manufacturability on both the producer and customer fronts. The effect of Si addition on the solid solution hardening of ferrite has been well illustrated. Higher carbon content of 0.2% together with alloying elements that decrease the Ms temperature contributes to the strength of martensite. The addition of Nb results in finer grains of both ferrite and martensite. The addition of Mn is helpful to harden ferrite. However, it increases the strength of the hot bands as well by facilitating the formation of lower temperature transformation products in the as rolled structure. Mn, Cr and Mo should be optimized to achieve the proper amount of martensite in the final microstructure. The combination of C, Mn, Si and Al which affect Ac1 and Ac3 temperatures should be adjusted to ensure necessary austenite fraction during annealing within the typical industrial process window (about 750-850° C.). Mn, Si and Al should be minimized to improve the coatability of the strip as well.

FIG. 8 shows the balance of TS-TE and YS-TE. FIG. 8 plots the total elongation TE in % vs yield strength YS (squares) and tensile strength TS (diamonds) in MPa for all sample alloys. The best combination is TS about 1180-1250 MPa, YS about 550-650 MPa, and TE about 15-18%. Based on the tensile results, the composition: 0.2C-1.5Mn-1.3Si-0.65Al-0.3Mo-0.02Nb is considered as the best combination of TS and TE. The hot band strength for this composition (CT 620° C.) is YS about 630 MPa, and TS about 800 MPa. The properties after annealing are: YS about 550 MPa, TS about 1250 MPa, and TE about 14-16%.

While the yield strength may be a bit low, it is believed that there is less chance of auto tempering of martensite due to the high alloy amount (leading to lower Ms) and this has an impact.

The selected composition (0.2C-1.5Mn-1.3Si-0.65Al-0.3Mo-0.02Nb) raises two concerns for GA 1180 HF production; higher C than the desired maximum limit of 0.19% C and high alloy cost due to 0.3Mo addition. Therefore, a modified composition (0.18C-1.8Mn-1.5Si-0.65Al-0.02Nb-0.15Mo—shown in Table 4) has been investigated. The modified alloy substitutes 0.3% Si and 0.3% Mn for of 0.15% of the Mo. Table 5 shows the tensile properties of modified alloy 7 which is very similar to alloy 8. The annealed tensile properties of modified alloy 8 are similar to those of alloy 8, as shown in Table 6. Therefore, this modification is considered as reasonable.

TABLE 4

| ID | C | Mn | Si | Nb | Mo | Al | P | S | N |
|---|---|---|---|---|---|---|---|---|---|
| Mod 7 | 0.17 | 1.81 | 1.55 | 0.02 | 0.15 | 0.65 | 0.017 | 0.005 | 0.0045 |

TABLE 5

| Type | FT | CT | YS | TS | UE | TE | YPE | n | YR |
|---|---|---|---|---|---|---|---|---|---|
| ASTM T | 865 | 580 | 631 | 867 | 11.0 | 15.9 | 0.0 | 0.163 | 0.73 |

TABLE 6

| AT, C | G, mm | YS, MPa | TS, MPa | UE, % | TE, % | YPE, % | N6-ue | YR |
|---|---|---|---|---|---|---|---|---|
| 775 | 1.54 | 487 | 1121 | 9.6 | 13.6 | 0.0 | 0.152 | 0.43 |
| 775 | 1.55 | 467 | 1069 | 8.9 | 12.6 | 0.0 | 0.166 | 0.44 |
| 800 | 1.55 | 521 | 1191 | 9.5 | 13.2 | 0.0 | 0.140 | 0.44 |
| 800 | 1.56 | 526 | 1195 | 9.2 | 13.0 | 0.0 | 0.138 | 0.44 |
| 825 | 1.58 | 543 | 1222 | 10.4 | 17.1 | 0.0 | 0.131 | 0.44 |
| 825 | 1.52 | 556 | 1246 | 10.3 | 14.1 | 0.0 | 0.130 | 0.45 |
| 850 | 1.57 | 544 | 1209 | 10.1 | 13.7 | 0.0 | 0.133 | 0.45 |
| 850 | 1.57 | 542 | 1201 | 9.6 | 13.3 | 0.0 | 0.132 | 0.45 |

Hole Expansion

All measurements of selected samples show less than 10% HE which doesn't meet the desire target of 30% min. There is no necking and an obvious brittle fracture is observed in the tensile specimens. This can be correlated with poor HE performance. Metallurgically, the absence of tempering of the microstructure is contributing to the low hole expansion value and the low YS. Since all alloys have high alloying amounts the Ms temperature is decreased and auto-tempering is delayed during the post galvanneal cooling at the CL HDGL. An improvement in hole expansion and YS is necessary.

Effect of Post Annealing

Post batch annealing has been applied to the finished steel. The batch annealing cycle consisted of heating/cooling to tempering temperatures at a rate of 25° C./hr and isothermal tempering at the desired temperature for 5 hrs. FIGS. 9a-9d show the effect of post batch annealing on tensile properties. FIG. 9a plots yield strength YS in MPa vs post batch annealing temperature in ° C. for sample alloys containing 0.13 and 0.2% C. FIG. 9b plots tensile strength TS in MPa vs post batch annealing temperature in ° C. for sample alloys containing 0.13 and 0.2% C. FIG. 9c plots uniform elongation UEL in % vs post batch annealing temperature in ° C. for sample alloys containing 0.13 and 0.2% C. FIG. 9d plots total elongation EL in % vs post batch annealing temperature in ° C. for sample alloys containing 0.13 and 0.2% C. An increase in batch annealing temperature (BAT) significantly improves YS, but at a cost of UEL. It is worth mentioning that TE and TS slightly decrease. In addition, hole expansion improves to about 17% at BAT of 200° C., however it still not enough and significantly below the desired target of 30%. The results indicate the need for higher BAT such as 250° C. and higher. It should be noted that there may be non-uniform temperature issues using the batch anneal process (hot/cold spots during multi stack anneal).

In an attempt to avoid this, post tempering can be applied by in-line induction heating (for a shorter time than batch annealing). The samples having higher initial TS have been used in order to compensate for the loss in TS due to tempering. FIGS. 10a-10d show the effect of short time induction annealing on the tensile properties of the steel.

FIG. 10a plots yield strength YS in MPa vs post batch annealing temperature in ° C. for sample alloys 9 and 10 and a sample alloy containing 0.15% C. FIG. 10b plots tensile strength TS in MPa vs post batch annealing temperature in ° C. for sample alloys 9 and 10 and a sample alloy containing 0.15% C. FIG. 10c plots uniform elongation UEL in % vs post batch annealing temperature in ° C. for sample alloys 9 and 10 and a sample alloy containing 0.15% C. FIG. 10d plots total elongation EL in % vs post batch annealing temperature in ° C. for sample alloys 9 and 10 and a sample alloy containing 0.15% C. Similar to batch annealing, tempering increases YS, but at a cost of UEL. This confirms that higher post tempering temperatures improve hole expansion. The results suggest a tempering temperature higher than 300° C. The magnitude of the effect of post tempering depends on the steel composition. The initial TS should be modified to achieve TS>1180 MPa after heat treatment since post tempering at high temperature reduces TS.

Figure 11B:
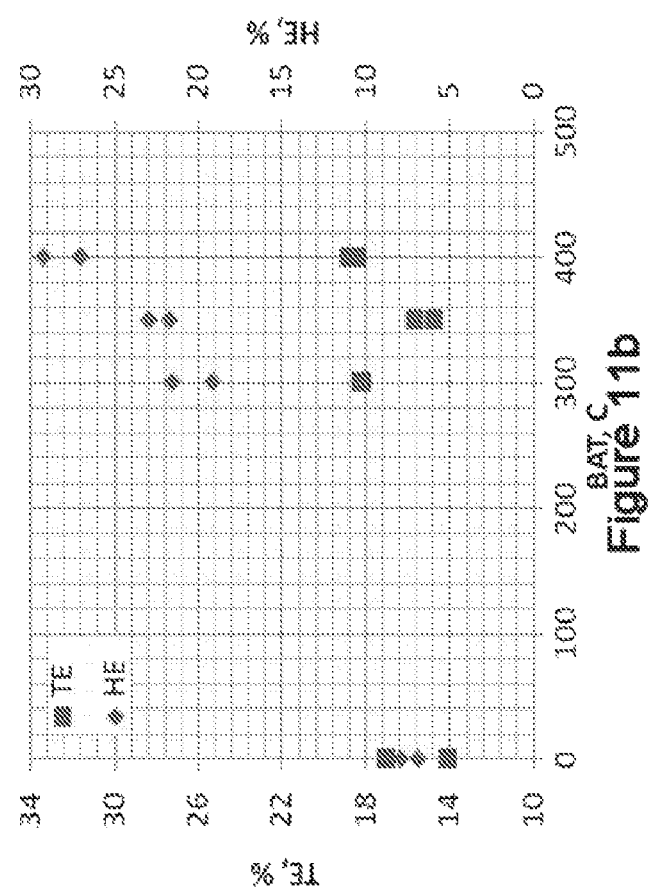
FIG. 11b plots the total elongation TE in % and hole expansion in % vs post batch annealing temperature in ° C. for samples with a pre batch annealing TS of >1180 Mpa.
Figure 11A:
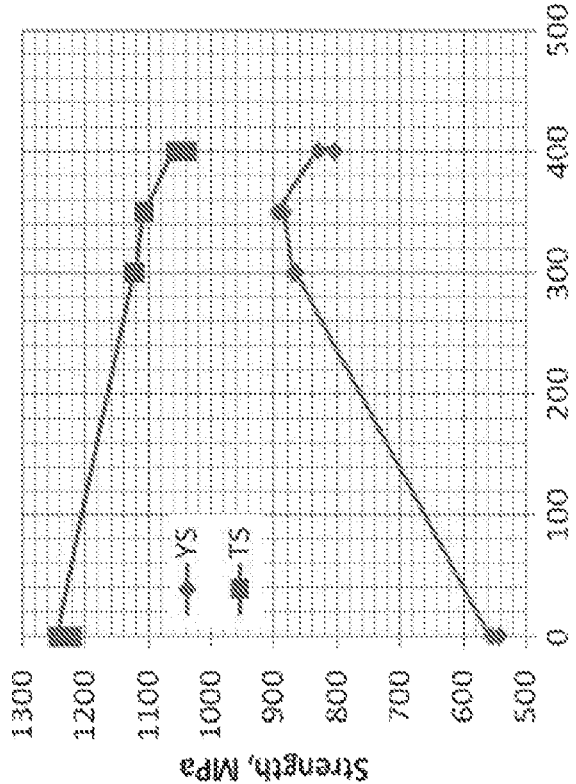
FIG. 11a plots the yield strength YS and tensile strength TS in MPa vs post batch annealing temperature for samples with a pre batch annealing TS of >1180 MPa.
Figure 12:
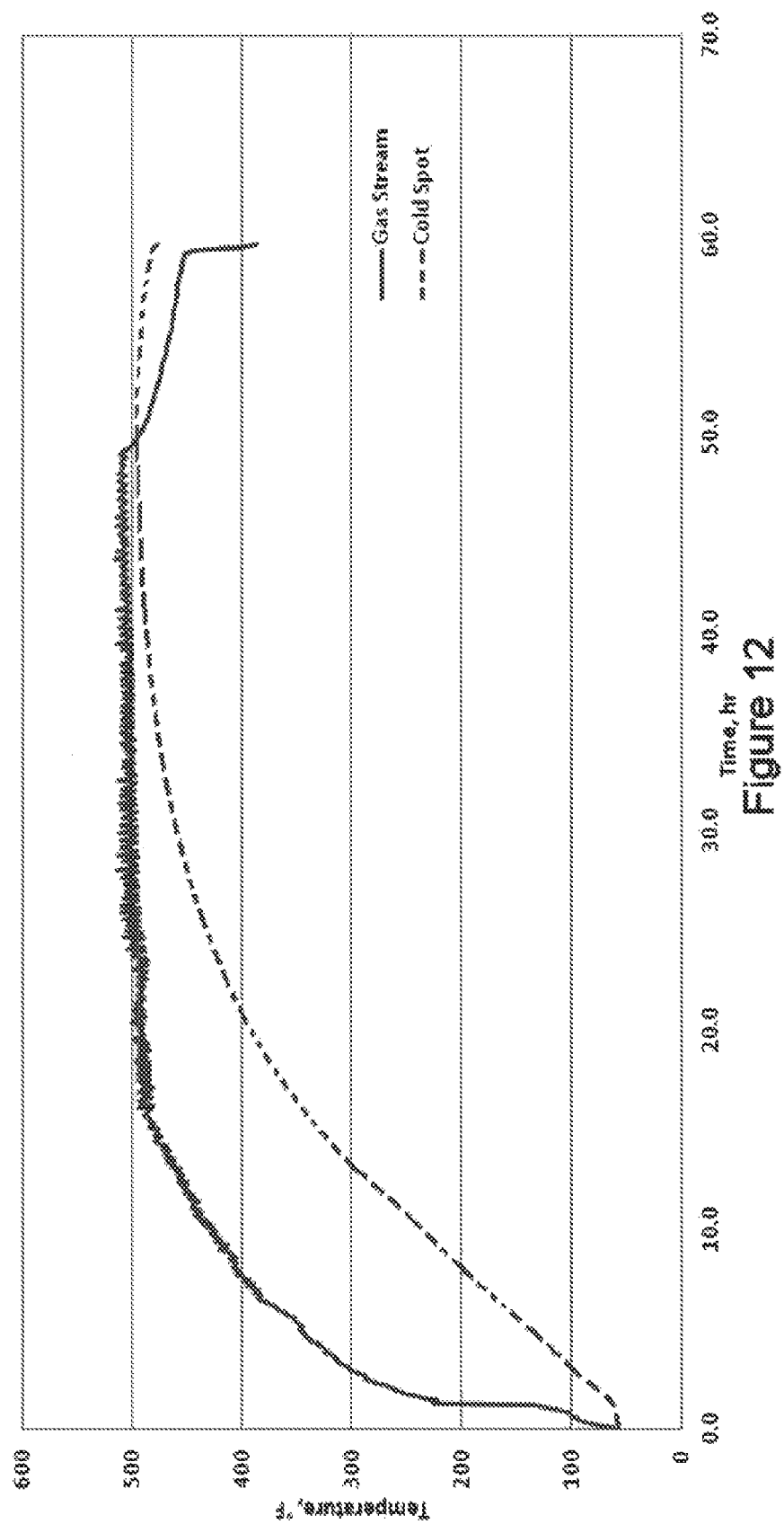
FIG. 12 plots temperature in ° C. vs time in hours for a batch annealing cycle from a specific steel-making plant.

Annealed panels of modified alloy 8 (AT=825C) have been isothermally post tempered at various temperatures for 6 hrs. FIGS. 11a-11b show the effect of post tempering temperature on tensile properties and hole expansion. FIG. 11a plots the yield strength YS and tensile strength TS in MPa vs post batch annealing temperature for samples with a pre batch annealing TS of >1180 MPa. FIG. 11b plots the total elongation TE in % and hole expansion in % vs post batch annealing temperature in ° C. for samples with a pre batch annealing TS of >1180 MPa. YS is dramatically increased up to a tempering temperature of 350° C., then decreases. TS gradually reduced with increasing tempering temperature and TE remains relatively constant within the investigated temperature range. Hole expansion gradually improves as well. Based on these results, a further post tempering simulation has been performed using a batch annealing cycle from a specific plant, which is depicted in FIG. 12. FIG. 12 plots temperature in ° C. vs time in hours for a batch annealing cycle from a specific steel-making plant. This cycle with an intended temperature of 260° C. (500° F.) has no temperature differential between hot and cold spots due to the long annealing time. Table 7 summarizes the JIS-T tensile properties and hole expansion data. This low temperature post batch annealing introduces non-uniformity of strength and ductility by about 20-30 MPa and about 1%, respectively. This non-uniformity is quite similar to the expected variation along the coil length. However, it requires a higher initial TS to ensure TS>1180 MPa after post batch annealing. The increase in Mn by 0.2% will provide an additional tensile strength of about 80 MPa to accommodate for the tensile drop upon post batch annealing.

TABLE 7

| Condition | G, mm | YS, MPa | TS, MPa | UE, % | TE, % | YPE, % | n6-ue | YR | HE, % |
|---|---|---|---|---|---|---|---|---|---|
| Cold Spot | 1.55 | 875 | 1162 | 9.4 | 17.5 | 0.3 | 0.096 | 0.75 | 23 |
| | 1.55 | 880 | 1162 | 9.2 | 15.7 | 0.2 | 0.096 | 0.76 | |
| Hot Spot | 1.61 | 858 | 1137 | 8.8 | 15.5 | 0.9 | 0.100 | 0.76 | 23 |
| | 1.59 | 857 | 1133 | 8.7 | 14.3 | 0.0 | 0.098 | 0.76 | |

EXAMPLES

Abbreviations

UTS (MPa) refers to the ultimate tensile strength measured by tensile test in the longitudinal direction relative to the rolling direction, YS (MPa) refers to the yield strength measured by tensile test in the longitudinal direction relative to the rolling direction, TEl (%) refers to the total elongation.
UTS, YS and Tel can be measured following several tests. Tests used for examples 1 and 2 are according to JIS-T standard whereas tests used for example 3 are according to ISO standards.

HE (%) refers to the hole expansion. Such test can be performed with the help of a conical punch made of a cylindrical part which diameter is 45 mm, topped by a conical part. Such punch is being positioned under the steel sheet to test and which has been previously provided with a hole of an initial diameter Do of 10 mm. The conical punch is then being moved upwards into such hole and does enlarge it until a first traversing crack appears. The final diameter D of the hole is then being measured and the hole expansion is calculated using the following relationship:

Another possibility to perform such test is to use a so called flat punch, made of a cylinder with a diameter of 75 mm, all other conditions being similar.

Microstructures were observed using a SEM at the quarter thickness location, using 2% Nital etching and quantified by image analysis.

Example 1

Semi-finished products have been produced from steel castings. The chemical compositions of the semi-finished products, expressed in weight percent, are shown in Table 8 below. The rest of the steel compositions in Table 8 consists in iron and inevitable impurities resulting from the smelting.

TABLE 8

Table 8: Chemical composition (wt %, B in ppm).

| | C | Si | Mn | P | S | Cu | Al | Ti | Nb | N | Cr | Ni | B | Mo |
|---|---|---|---|---|---|---|---|---|---|---|---|---|---|---|
| A | 0.17 | 1.55 | 1.81 | 0.017 | 0.005 | — | 0.65 | — | 0.020 | 0.0045 | — | — | — | 0.15 |
| B | 0.15 | 0.7 | 2.6 | 0.015 | 0.003 | — | 0.8 | — | 0.010 | 0.0046 | — | — | — | 0.15 |
| C | 0.21 | 1.3 | 1.5 | 0.016 | 0.003 | — | 0.58 | — | 0.021 | 0.0042 | — | — | 10 | 0.30 |
| D | 0.21 | 1.3 | 1.5 | 0.016 | 0.003 | — | 0.58 | — | 0.020 | 0.0041 | — | — | — | 0.30 |

Ingots of composition A to D were initially hot rolled to 20 mm thick plates. Then, the plates were reheated and hot-rolled again down to 3.8 mm. The hot rolled steel plates were then cold rolled and annealed. The process parameters undergone are shown hereunder:

Finishing rolling temperature: 875° C.
Coiling temperature: 580° C.
Cold rolling reduction rate: around 50%
Soaking temperature during annealing: 825° C.
Soaking duration during annealing: 150 s.

After annealing, coating by hot dip galvanizing in a bath of molten zinc was simulated by heating the steel sheets at a temperature of 460° C., followed by a galvannealing treatment at 575° C.

The microstructure of steel sheets A to D contains ferrite (including bainitic ferrite), martensite and MA islands in surface proportion given in the Table 9 below, before being submitted to post tempering by two different ways. Such surface fractions are unchanged after post tempering which is only modifying the carbon concentration inside those phases.

TABLE 9

Table 9: Microstructures (surface %)

|   | Ferrite | Martensite + MA islands |
|---|---|---|
| A | 67 | 43 |
| B | 42 | 58 |
| C | 56 | 44 |
| D | 58 | 42 |

Post Tempering by Batch Annealing

Post tempering of a set of steel sheets A was performed by heating such steels as a coil in a batch annealing furnace. The heating and cooling rates before and after tempering were done at a rate of 25° C./h isothermal tempering was done at the desired temperature for 5 hours.

Post Tempering by Induction Heating

Post tempering of a set of steel sheets B to D was performed by induction heating the steel sheets to reach the desired temperature, which was maintained during the times specified in Table 11.

TABLE 11

Table 4: Mechanical properties

|   | Thickness (mm) | UTS (MPa) | YS (MPa) | Tel (%) | HE (%) |
|---|---|---|---|---|---|
| B (without tempering) | 1.59 | 1319 | 645 | 14.2 | nm |
| B - 300° C. - 30 sec | 1.56 | 1240 | 943 | 13.6 | 22.7 |
| B - 400° C. - 30 sec | 1.53 | 1141 | 969 | 10.9 | 33.7 |
| C (without tempering) | 1.52 | 1308 | 605 | 14.3 | nm |
| C - 300° C. - 30 sec | 1.54 | 1221 | 784 | 15.3 | 16.8 |
| C - 400° C. - 30 sec | 1.54 | 1149 | 896 | 13.4 | 32.0 |
| D (without tempering) | 1.42 | 1235 | 564 | 14.8 | nm |
| D - 250° C. - 30 sec | 1.37 | 1158 | 576 | 14.8 | 12.2 |
| D - 300° C. - 30 sec | 1.42 | 1159 | 729 | 15.2 | 17.5 |

HE: conical punch

It can be seen from Table 11 that the post tempering treatment decreases slightly the tensile strength but increases notably the yield strength and hole expansion properties. The hole expansion of samples B, C and D without tempering was not measurable as the steel was too brittle Example 2

Semi-finished products have been produced from steel castings. The chemical composition of the semi-finished products, expressed in weight percent, is shown in Table 12 below. The rest of the steel composition in Table 12 consists in iron and inevitable impurities resulting from the smelting.

TABLE 12

Table 12: Chemical composition (wt %, B in ppm).

|   | C | Si | Mn | P | S | Cu | Al | Ti | Nb | V | N | Cr | Ni | B | Mo |
|---|---|---|---|---|---|---|---|---|---|---|---|---|---|---|---|
| E | 0.18 | 1.52 | 1.99 | 0.013 | 0.005 | 0.04 | 0.62 | 0.005 | 0.007 | 0.007 | 0.0065 | 0.04 | 0.01 | 3 | 0.15 |

It can be seen from Table 10 that the post tempering treatment decreases slightly the tensile strength and the total elongation but increases notably the yield strength and hole expansion properties. In fact the hole expansion of sample A without tempering was not measurable as the steel was too brittle.

TABLE 10

Table 10: Mechanical properties

|   | Thickness (mm) | UTS (MPa) | YS (MPa) | Tel (%) | HE (%) |
|---|---|---|---|---|---|
| A (without tempering) | 1.41 | 1227 | 555 | 15.6 | nm |
| A - 200° C. | 1.36 | 1195 | 802 | 13.9 | 17 | nm: not measured

Ingot of composition E was initially hot rolled to 20 mm thick plates. Then, the plates were reheated and hot-rolled again down to 3.8 mm. The hot rolled steel plates were then cold rolled and annealed. The process parameters undergone are shown hereunder:

Finishing rolling temperature: 930° C.
Coiling temperature: 680° C.
Cold rolling reduction rate: around 50%
Soaking temperature during annealing: 825° C.
Soaking duration during annealing: 150 s.

After annealing, coating by hot dip galvanizing in a bath of molten zinc was performed in a bath at a temperature of 460° C., followed by a galvannealing treatment.

The microstructure of steel sheets E contains ferrite (including bainitic ferrite), martensite and MA islands in surface proportion according to the invention, before being submitted to post tempering by batch annealing. Such surface fractions are unchanged after post tempering which is only modifying the carbon concentration inside those phases.

Post Tempering by Batch Annealing

Post tempering of a set of steel sheets E was performed by heating such steels as a coil in a batch annealing furnace. Isothermal tempering was done at the desired temperature for 5 hours. Temper rolling was then performed with 0.3% elongation.

TABLE 13

Table 6: Mechanical properties

|  | Thickness (mm) | UTS (MPa) | YS (MPa) | Tel (%) | HE (%) |
|---|---|---|---|---|---|
| E (without tempering) | 1.4 | 1180 | 560 | 10 | nm |
| E - 290° C. | 1.4 | 1150 | 760 | 15 | 18 | nm: not measured
HE: conical punch

It can be seen from Table 13 that the post tempering treatment decreases slightly the tensile strength and the total elongation but increases notably the yield strength and hole expansion properties. In fact the hole expansion of sample E without tempering was not measurable as the steel was too brittle.

After such post tempering, the galvannealed coatings were not damaged and their iron content was 11% without significant increase due to post tempering.

Example 3

Semi-finished products have been produced from a steel casting. The chemical composition of the semi-finished products, expressed in weight percent, is shown in Table 14 below. The rest of the steel composition in Table 14 consists in iron and inevitable impurities resulting from the smelting.

TABLE 14

Table 14: Chemical composition (wt %).

|  | C | Si | Mn | P | S | Cu | Al | Ti | Nb | N | Cr | Ni | Mo |
|---|---|---|---|---|---|---|---|---|---|---|---|---|---|
| F | 0.22 | 0.11 | 1.73 | 0.02 | 0.001 | 0.04 | 1.49 | 0.01 | 0.01 | 0.01 | 0.02 | 0.02 | 0.13 |

Ingots of composition F were initially hot rolled to 4 mm thick plates. The hot rolled steel plates were then cold rolled and annealed. The process parameters undergone are shown hereunder:

Finishing rolling temperature: 900° C.
Coiling temperature: 550° C.
Cold rolling reduction rate: around 50%
Soaking temperature during annealing: 850° C.
Soaking duration during annealing: 100 s.

After annealing, coating by hot dip galvanizing in a bath of molten zinc was performed with an immersion temperature of 455° C., followed by a galvannealing treatment at 540° C.

The microstructure of steel sheet F contains 71% of ferrite (including bainitic ferrite), 20% of martensite and 9% of austenite before being submitted to post tempering by two different ways. Such surface fractions are unchanged after post tempering which is only modifying the carbon concentration inside those phases.

Post Tempering by Batch Annealing

Post tempering of a first set of steel sheets E was performed by heating such steels as a coil in a batch annealing furnace. Isothermal tempering was done at the desired temperature for 8 hours.

TABLE 15

Table 15: Mechanical properties

|  | Thickness (mm) | UTS (MPa) | YS (MPa) | Tel (%) | HE (%) |
|---|---|---|---|---|---|
| E (without tempering) | 2 | 802 | 486 | 23.9 | 17.9 |
| E - 150° C. | 2 | 810 | 488 | 25.7 | 20.0 |
| E - 200° C. | 2 | 805 | 500 | 25.8 | 21.1 |
| E - 250° C. | 2 | 766 | 544 | 23.2 | 25.3 |
| E - 400° C. | 2 | 750 | 593 | 18.7 | 25.3 |
| E - 500° C. | 2 | 706 | 541 | 19.8 | 22.1 |

HE: flat punch

Hole expansion was measured by flat punch which is a tougher test than conical punch and gave lower values than hereunder. However, trends are similar whatever the test used.

It can be seen from Table 15 that the post tempering treatment decreases slightly the tensile strength but increases notably the yield strength and hole expansion properties up to 500° C.

After such post tempering, the galvannealed coatings were not damaged and their iron content was 10% without significant increase due to post tempering.

Post Tempering by Induction Heating

Post tempering of a second set of steel sheets E was performed by induction heating the steel sheets to reach the desired temperature, which was maintained during the times specified in table 16.

TABLE 16

Table 16: Mechanical properties

|  | Thickness (mm) | UTS (MPa) | YS (MPa) | Tel (%) | HE (%) |
|---|---|---|---|---|---|
| E (without tempering) | 2 | 802 | 486 | 23.9 | 22.1 |
| E - 200° C. - 2 min | 2 | 806 | 487 | 24.6 | 24.7 |
| E - 400° C. - 2 min | 2 | 795 | 493 | 24.1 | 24.7 |
| E - 400° C. - 10 min | 2 | 751 | 558 | 24.5 | 30.5 |
| E - 500° C. - 2 min | 2 | 802 | 508 | 24.1 | 26.3 |
| E - 500° C. - 10 min | 2 | 779 | 515 | 18.9 | 30 |

HE: conical punch

It can be seen from Table 16 that the post tempering treatment decreases slightly the tensile strength but increases notably the yield strength and hole expansion properties.

After such post tempering, the galvannealed coatings were not damaged and their iron content was 10% without significant increase due to post tempering.

Table 17B shows the properties of a zinc coated steel sheets as coated and after post annealing at 288° C., the steel sheets having compositions provided in Table 17A. As can be seen the annealing has increased the yield strength by at least 30% compared with the as coated sheet, preferably 40%. The annealing has also increased the total elongation by at least 25% compared with the as coated sheet, preferably at least 40%. Finally, the annealing has increased the hole expansion by at least 80% compared with the as coated sheet, preferably 95%.

TABLE 17A

| Heat | C | Mn | P | S | Si | Al |
|---|---|---|---|---|---|---|
| 9507219 | 0.18 | 2.03 | 0.013 | 0.003 | 1.57 | 0.655 |
| 9507220 | 0.18 | 1.99 | 0.013 | 0.005 | 1.52 | 0.616 |

| Heat | Cu | Ni | Cr | Mo | Sn | Cb |
|---|---|---|---|---|---|---|
| 9507219 | 0.04 | 0.01 | 0.03 | 0.15 | 0.014 | 0.011 |
| 9507220 | 0.04 | 0.01 | 0.04 | 0.15 | 0.010 | 0.007 |

| Heat | V | Sb | Ti | Ca | B | N |
|---|---|---|---|---|---|---|
| 9507219 | 0.008 | 0.001 | 0.007 | 0.0003 | 0.0004 | 0.0063 |
| 9507220 | 0.007 | 0.000 | 0.005 | 0.0003 | 0.0003 | 0.0065 |

TABLE 17A

| Sample | Property | As coated | PBA + TR | % Improvement |
|---|---|---|---|---|
| 5520046 | YS, Mpa | 550-580 | 750-850 | 41.6 |
|  | TS, Mpa | 1160-1220 | 1100-1150 | — |
|  | TE, % | 10-12.5 | 15-17 | 42.2 |
|  | HE, % | <10 | 18-21 | 95.0 |
|  | Bend, r/t | >4 | 2.2-2.4 | — |
| 5520047 | YS, Mpa | 550-595 | 770-850 | 41.5 |
|  | TS, Mpa | 1170-1240 | 1110-1170 | — |
|  | TE, % | 10-12.5 | 13.5-15.5 | 28.9 |
|  | HE, % | <10 | 16-20 | 80.0 |
|  | Bend, r/t | >4 | 2.2-2.4 | — |
| 5520380 | YS, Mpa | 550-580 | 750-820 | 38.9 |
|  | TS, Mpa | 1150-1215 | 1140-1175 | — |
|  | TE, % | 6.0-12 | 13-15.5 | 58.3 |
|  | HE, % | <10 | 21-25 | 130.0 |
|  | Bend, r/t | >4 | 2-2.5 | — |
| 5520379 | YS, Mpa | 540-580 | 700-820 | 35.7 |
|  | TS, Mpa | 1150-1210 | 1110-1180 | — |
|  | TE, % | 7.5-13 | 12-15.5 | 34.1 |
|  | HE, % | <10 | 15-21 | 80.0 |
|  | Bend, r/t | >4 | 2.3-2.5 | — |

The steel sheets according to the invention will be beneficially used for the manufacture of structural or safety parts in the automobile industry. It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

What is claimed is:

1. A method for forming a cold rolled, coated and post batch annealed steel sheet comprising the steps of:
    cold rolling a steel sheet comprising (in wt. %):
        C-0.1-0.3%;
        Mn-1-3%;
        Si-0.5-3.5%;
        Al-0.05-1.5%; and
    one or more elements selected from a group consisting of Mo, P, S, N, Cu, Ti, Nb, Ni, Cr, B, V, Sn, Cb, Sb, Ca, and Cr;
    Mo+Cr being between 0-1.0%;
    coating the cold rolled steel sheet with a zinc or zinc alloy coating, the cold rolled, coated steel sheet having an initial hole expansion, an initial yield strength, an initial tensile strength and an initial total elongation prior to post batch annealing; and
    post batch annealing the cold rolled, coated steel sheet, a peak temperature of the post batch annealing being in a range from 150 to 650° C., the cold rolled, coated and post batch annealed steel sheet having a final hole expansion, a final yield strength, a final tensile strength and a final total elongation after post batch annealing;
    the final hole expansion being at least 80% greater than the initial hole expansion, and the final yield strength being at least 30% greater than the initial yield strength, wherein:
    the final hole expansion is from 15 to 25%,
    the final yield strength is from 700 to 850 MPa, and
    the final tensile strength is from 1100 to 1200 Mpa.

2. The method for forming a cold rolled, coated and post batch annealed steel sheet of claim 1, further comprising the steps of:
    hot rolling the steel sheet prior to coating the cold rolled steel sheet, the hot rolling having a hot rolling finishing temperature in a range from 840 to 890° C.; and
    coiling the hot rolled steel sheet at a coiling temperature in a range from 500 to 650° C.

3. The method for forming a cold rolled, coated and post batch annealed steel sheet of claim 1, wherein the post batch annealing comprises:
    heating the cold rolled steel sheet at a rate of 25° C./h;
    isothermal tempering the cold rolled steel sheet at the tempering temperature for at least 5 hours; and
    cooling the cold rolled steel sheet at a rate of 25° C./h.

4. The method for forming a cold rolled, coated and post batch annealed steel sheet of claim 1, wherein the peak temperature is from 150 to 450° C. and the post batch annealing occurs for at least 5 hours.

5. The method for forming a cold rolled, coated and post batch annealed steel sheet of claim 1, wherein the peak temperature is from 200 to 400° C. and the post batch annealing occurs for at least five hours.

6. The method for forming a cold rolled, coated and post batch annealed steel sheet of claim 1, wherein the post batch annealing occurs for at least five hours.

7. The method for forming a cold rolled, coated and post batch annealed steel sheet of claim 1, wherein the final hole expansion is at least 95% greater than the initial hole expansion and the final yield strength is at least 40% greater than the initial yield strength.

8. The method for forming a cold rolled, coated and post batch annealed steel sheet of claim 1, wherein the steel sheet comprises (in wt. %):
    C-0.15-0.25%;
    Mn-2-2.5%;
    Si-1.5-2.5%;
    Al-0.05-1.0%; and
    Mo+Cr is between 0.2 to 0.5%.

9. The method for forming a cold rolled, coated and post batch annealed steel sheet of claim 1, wherein the steel sheet comprises (in wt. %) C-0.15-0.25% and Al-0.05-1.0%.

10. The method for forming a cold rolled, coated and post batch annealed steel sheet of claim 1, wherein the steel sheet comprises (in wt. %) C-0.15-0.25%.

11. The method for forming a cold rolled, coated and post batch annealed steel sheet of claim 1, wherein the final hole expansion is from 15 to 25% and the final total elongation is from 12 to 17%.

12. The method for forming a cold rolled, coated and post batch annealed steel sheet of claim 1, wherein the final total elongation is at least 25% greater than the initial total elongation.

13. The method for forming a cold rolled, coated and post batch annealed steel sheet of claim 1, wherein the initial yield strength is from 540 to 595 MPa.

14. The method for forming a cold rolled, coated and post batch annealed steel sheet of claim 1, wherein the initial tensile strength is greater than the final tensile strength and the final tensile strength is from 1100 to 1200 MPa.

15. The method for forming a cold rolled, coated and post batch annealed steel sheet of claim 1, wherein
the final total elongation is from 12 to 17%.

16. The method for forming a cold rolled, coated and post batch annealed steel sheet of claim 15, wherein the post batch annealing occurs for at least 5 hours.

17. The method for forming a cold rolled, coated and post batch annealed steel sheet of claim 16, wherein a microstructure of the cold rolled, coated and post batch annealed steel sheet consists of at least ferrite, bainitic ferrite and martensite including MA islands and optionally residual austenite.

18. The method for forming a cold rolled, coated and post batch annealed steel sheet of claim 17, wherein the microstructure consists of ferrite, bainitic ferrite and martensite including MA islands.

19. The method for forming a cold rolled, coated and post batch annealed steel sheet of claim 1, further comprising the step of:
coiling the coated steel into at least one coil, after the coating step and prior to the post batch annealing step; and
wherein the coating is by hot dip galvanizing in a bath of molten zinc or zinc alloy.

20. The method for forming a cold rolled, coated and post batch annealed steel sheet of claim 1, wherein a microstructure of the cold rolled, coated and post batch annealed steel sheet consists of at least ferrite, bainitic ferrite and martensite including MA islands and optionally residual austenite.

21. The method for forming a cold rolled, coated and post batch annealed steel sheet of claim 20, wherein the microstructure consists of ferrite, bainitic ferrite and martensite including MA islands.

22. The method for forming a cold rolled, coated and post batch annealed steel sheet of claim 20, wherein the post batch annealing occurs for at least 5 hours.

23. The method for forming a cold rolled, coated and post batch annealed steel sheet of claim 22, wherein the final hole expansion is from 15 to 25%.

24. The method for forming a cold rolled, coated and post batch annealed steel sheet of claim 23, wherein the final tensile strength is from 1100 to 1200 MPa and the final total elongation is from 12 to 17%.

25. The method for forming a cold rolled, coated and post batch annealed steel sheet of claim 20, wherein:
the post batch annealing occurs for at least 5 hours, and
the final total elongation is from 12 to 17%.

26. The method for forming a cold rolled, coated and post batch annealed steel sheet of claim 25, wherein the microstructure consists of ferrite, bainitic ferrite and martensite including MA islands.

27. The method for forming a cold rolled, coated and post batch annealed steel sheet of claim 1, wherein the final tensile strength is less than the initial tensile strength and the final total elongation is 25% greater than the initial total elongation.

28. The method for forming a cold rolled, coated and post batch annealed steel sheet of claim 27, wherein the post batch annealing occurs for at least five hours.

29. The method for forming a cold rolled, coated and post batch annealed steel sheet of claim 1, wherein the steel sheet comprises (in wt. %) Mo+Cr is between 0.2 to 0.5%.

30. The method for forming a cold rolled, coated and post batch annealed steel sheet of claim 29, wherein the steel sheet comprises (in wt. %) Si-1.5-2.5%.

31. The method for forming a cold rolled, coated and post batch annealed steel sheet of claim 1, wherein the steel sheet comprises (in wt. %) Si-1.5-2.5%.

32. The method for forming a cold rolled, coated and post batch annealed steel sheet of claim 31, wherein the steel sheet comprises (in wt. %) C-0.15-0.25%.

33. The method for forming a cold rolled, coated and post batch annealed steel sheet of claim 1, wherein one or more elements are selected from a group consisting of Mo, Cr, P, S, and N.

34. The method for forming a cold rolled, coated and post batch annealed steel sheet of claim 1, wherein the steel sheet further comprises Nb.

35. The method for forming a cold rolled, coated and post batch annealed steel sheet of claim 34, wherein Nb is in amount adapted for grain refinement of ferrite and martensite.

36. The method for forming a cold rolled, coated and post batch annealed steel sheet of claim 1, wherein the steel sheet comprises (in wt. %):
Mo-0.15-0.3%;
P-0.013-0.13%;
S-0.003-0.01%; and
N-0.0041-0.0065.

37. The method for forming a cold rolled, coated and post batch annealed steel sheet of claim 36, wherein the steel sheet further comprises Cr.

38. The method for forming a cold rolled, coated and post batch annealed steel sheet of claim 37, wherein the steel sheet comprises (in wt. %) Cr-0.03-0.04%.

39. The method for forming a cold rolled, coated and post batch annealed steel sheet of claim 36, wherein the steel sheet further comprises Nb.

40. The method for forming a cold rolled, coated and post batch annealed steel sheet of claim 39, wherein Nb is in amount adapted for grain refinement of ferrite and martensite.

41. The method for forming a cold rolled, coated and post batch annealed steel sheet of claim 40, wherein the steel sheet comprises (in wt. %) Nb-0.007-0.01.

42. A method for forming a cold rolled, coated and post batch annealed steel sheet comprising the steps of:
cold rolling a steel sheet comprising (in wt. %):
C-0.1-0.3%;
Mn-1-3%;
Si-0.5-3.5%;
Al-0.05-1.5%; and
0.05-0.1% of an element selected from a group consisting of Nb, Ti and V, the element comprising;
wherein Si+Al>0-1.0%;
coating the cold rolled steel sheet with a zinc or zinc alloy coating, the cold rolled, coated steel sheet having an initial hole expansion, an initial yield strength, an initial tensile strength and an initial total elongation prior to post batch annealing; and post batch annealing the cold rolled, coated steel sheet, a peak temperature of the post batch annealing being in a range from 200 to 650° C., the cold rolled, coated and post batch annealed steel sheet having a final hole expansion, a final yield strength, a final tensile strength and a final total elongation after post batch annealing; the final hole expansion being at least 80% greater than the initial hole expansion, and the final yield strength being at least 30% greater than the initial yield strength.

43. The method for forming a cold rolled, coated and post batch annealed steel sheet of claim 42, wherein the steel sheet comprises (in wt. %) Nb-0.05-0.1%.

44. The method for forming a cold rolled, coated and post batch annealed steel sheet of claim 43, wherein the steel sheet further comprises (in wt. %) Ti-0.05-0.1%.

45. The method for forming a cold rolled, coated and post batch annealed steel sheet of claim 44, wherein the steel sheet further comprises (in wt. %) V-0.05-0.1%.

46. The method for forming a cold rolled, coated and post batch annealed steel sheet of claim 42, wherein the steel sheet further comprises Mo and/or Cr, Mo+Cr being between 0-1.0%.

47. The method for forming a cold rolled, coated and post batch annealed steel sheet of claim 42, wherein the peak temperature of the post batch annealing is between 200 and 400° C.

48. The method for forming a cold rolled, coated and post batch annealed steel sheet of claim 42, wherein the final hole expansion is from 15 to 25%, the final yield strength is from 700 to 850 MPa, and the final tensile strength is from 1100 to 1200 Mpa.

49. The method for forming a cold rolled, coated and post batch annealed steel sheet of claim 48, wherein the final total elongation is from 12 to 17%.

* * * * *